(12) United States Patent
Numata et al.

(10) Patent No.: US 8,183,499 B2
(45) Date of Patent: May 22, 2012

(54) LASER PIERCING METHOD AND PROCESSING APPARATUS

(75) Inventors: Shinji Numata, Saitama-ken (JP); Yoshimi Sano, Saitama-ken (JP)

(73) Assignee: Nissan Tanaka Corporation, Saitama-Ken (JP)

( * ) Notice: Subject to any disclaimer, the term of this patent is extended or adjusted under 35 U.S.C. 154(b) by 1170 days.

(21) Appl. No.: 11/921,830

(22) PCT Filed: Jun. 6, 2006

(86) PCT No.: PCT/JP2006/311301
§ 371 (c)(1),
(2), (4) Date: Dec. 6, 2007

(87) PCT Pub. No.: WO2006/132229
PCT Pub. Date: Dec. 14, 2006

(65) Prior Publication Data
US 2009/0127239 A1   May 21, 2009

(30) Foreign Application Priority Data

Jun. 7, 2005 (JP) .................................. 2005-166996
Apr. 7, 2006 (JP) .................................. 2006-106982

(51) Int. Cl.
*B23K 26/38* (2006.01)
*B23K 26/14* (2006.01)
(52) U.S. Cl. ............. 219/121.71; 219/121.7; 219/121.84
(58) Field of Classification Search ............... 219/121.7, 219/121.71, 121.78, 121.79, 121.84
See application file for complete search history.

(56) References Cited

U.S. PATENT DOCUMENTS

| | | | |
|---|---|---|---|
| 4,945,207 A * | 7/1990 | Arai | 219/121.84 |
| 5,609,781 A | 3/1997 | Kaga et al. | |
| 5,688,418 A * | 11/1997 | Yoshiyasu et al. | 219/121.71 |
| 5,770,833 A | 6/1998 | Kanaoka et al. | |
| 6,316,743 B1 | 11/2001 | Nagahori et al. | |
| 6,492,617 B2 | 12/2002 | Nagahori et al. | |
| 6,777,641 B2 * | 8/2004 | Cole et al. | 219/121.7 |
| 2002/0125222 A1 * | 9/2002 | Iwase et al. | 219/121.8 |
| 2002/0166848 A1 * | 11/2002 | Furujo et al. | 219/121.71 |
| 2002/0190037 A1 * | 12/2002 | Steur et al. | 219/121.71 |

(Continued)

FOREIGN PATENT DOCUMENTS

DE    4336010 A1    10/1993

(Continued)

OTHER PUBLICATIONS

Machine translation of Japan Patent document No. 9-136,183, Aug. 2011.*

(Continued)

*Primary Examiner* — Geoffrey S Evans
(74) *Attorney, Agent, or Firm* — Nixon Peabody LLP

(57) ABSTRACT

A processing apparatus is provided in which a laser beam L2 is irradiated onto a processing portion of a workpiece W, and at the same time as the laser irradiation, an assist gas G is injected toward the processing portion from a nozzle 3 arranged concentric to the laser beam L2 so that the processing portion is covered with the assist gas G, thereby processing a piercing hole H on the processing portion. The apparatus includes control means 10 for processing a piercing hole H while moving the nozzle 3 within the range of 5 mm from a processing start point after the irradiation of the laser beam L2 is started.

10 Claims, 16 Drawing Sheets

U.S. PATENT DOCUMENTS

| | | | |
|---|---|---|---|
| 2003/0066821 A1* | 4/2003 | Wybrow et al. | 219/121.71 |
| 2004/0206733 A1* | 10/2004 | Hillebrand et al. | 219/121.71 |
| 2007/0187373 A1* | 8/2007 | Kilthau et al. | 219/121.71 |

FOREIGN PATENT DOCUMENTS

| | | | |
|---|---|---|---|
| JP | 61-123495 | * | 6/1986 |
| JP | 3-151182 | | 6/1991 |
| JP | 6-71473 A | * | 5/1994 |
| JP | 6-190582 A | | 7/1994 |
| JP | 07-16783 A | | 1/1995 |
| JP | 8-290285 | | 11/1996 |
| JP | 09-136183 A | * | 5/1997 |
| JP | 11-10382 | | 1/1999 |
| JP | 11-90670 | | 4/1999 |
| JP | 2000-237886 A | * | 9/2000 |
| JP | 2000-317660 A | * | 11/2000 |
| JP | 2001-047268 | | 2/2001 |
| JP | 2001-47268 A | * | 2/2001 |
| JP | 2001-321975 | | 11/2001 |
| JP | 3292021 B2 | | 6/2002 |
| JP | 2004-526574 | | 9/2004 |
| WO | WO-2004-041474 A1 | * | 5/2004 |

OTHER PUBLICATIONS

Machine translation of Japan Patent document No. 2001-47,268, Aug. 2011.*

International Search Report, PCT/JP2006/311301, dated Aug. 15, 2006.

Japanese Office Action for Application No. 2006-224127, mailed Jul. 12, 2011.

* cited by examiner

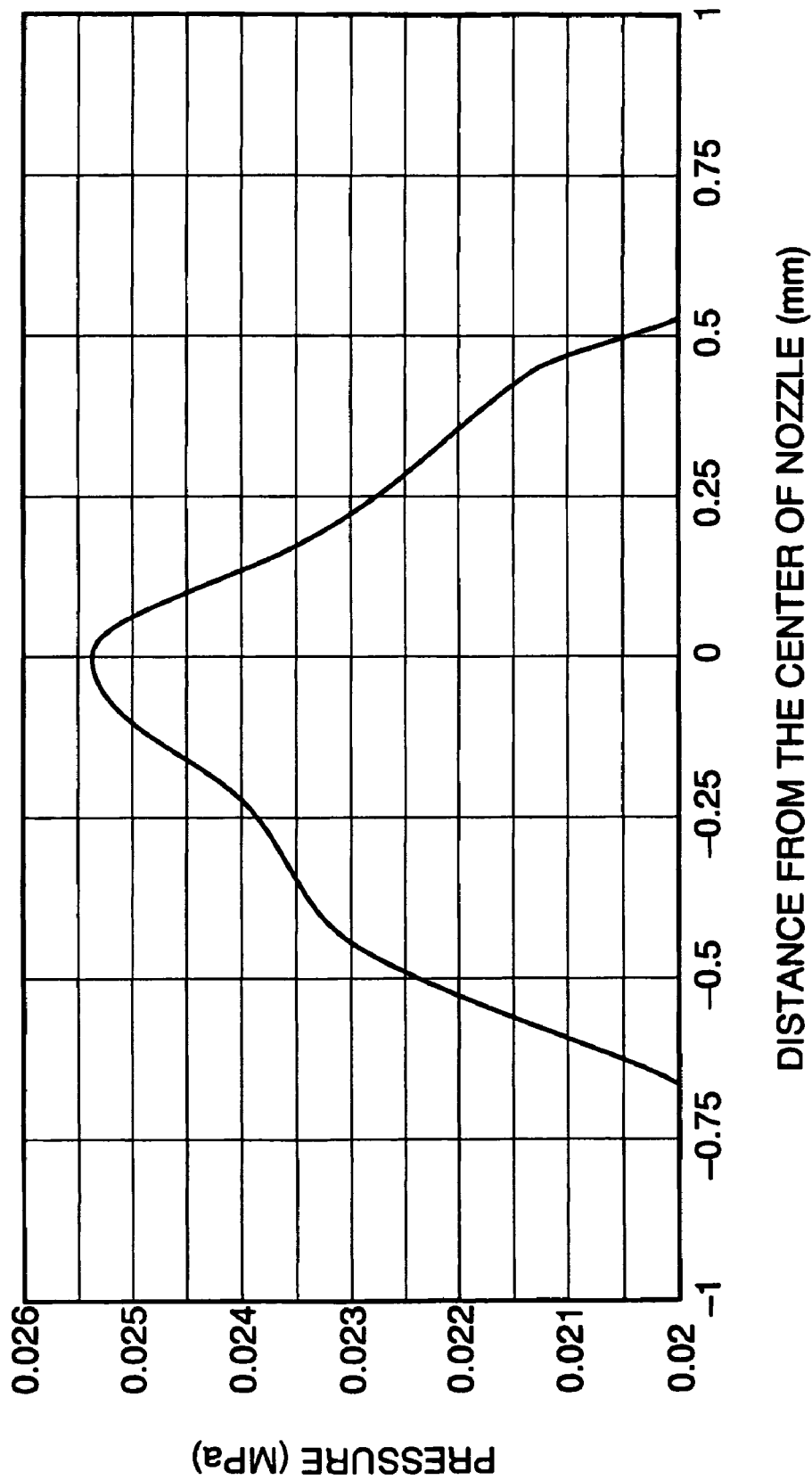

LASER PIERCING METHOD AND PROCESSING APPARATUS

CROSS REFERENCE TO RELATED APPLICATIONS AND PRIORITY CLAIM

This application is a U.S. national phase application of PCT/JP2006/311301 filed on Jun. 6, 2006, entitled "Laser Piercing Method and Processing Apparatus," which claims priority to Japanese Application No. 2005-166996 filed on Jun. 7, 2005, and Japanese Application No. 2006-106982 filed on Apr. 7, 2006, the entire contents of which are incorporated herein by reference.

TECHNICAL FIELD

The present invention relates to a method for piercing a workpiece with a laser processing apparatus, and more particularly, to a processing apparatus employing the piercing method.

This application is based upon and claims the benefit of priority from the prior Japanese Patent Application Nos. 2005-166996 filed on Jun. 7, 2005, and 2006-106982 filed on Apr. 7, 2006, the entire contents of which are incorporated herein by reference.

BACKGROUND ART

In the past, when cutting a workpiece such as a steel plate with a laser processing apparatus, the workpiece is laser-pierced to form a small through-hole with a diameter of several millimeters at a point on the workpiece serving as a cutting start point, and the cutting starts from the through-hole.

The through-hole is important in improving finishing precision of the workpiece without decreasing the yield of material, and is preferably formed to a desired size, as small as possible, but not too small to perform a subsequent cutting operation.

FIG. 17 illustrates a schematic structure of a laser torch 400 used in a laser processing apparatus. The laser torch 400 includes a nozzle 402 and a condenser lens 404. The nozzle 402 has a cylindrical shape, and is configured such that a laser beam L2 can pass through a proximal end 402a of the nozzle 402 toward an opening 402b provided at a distal end thereof. The condenser lens 404 is provided at the proximal end 402a.

The opening 402b of the nozzle 402 is coaxial with the laser beam L2 having passed through the condenser lens 404.

The nozzle 402 is provided with an inlet port 403 for introducing an assist gas G into the nozzle 402 when melting and evaporating the workpiece W by irradiation of the laser beam L2; the assist gas G reacts with the workpiece W, causing oxidation and burning of the workpiece W during the melting and evaporating operation.

When processing a piercing hole H2 on the workpiece W using the laser torch 400, the opening 402b of the nozzle 402 is opposed to the workpiece W, the assist gas G is introduced from the inlet port 403 into the inside of the nozzle 402, and the introduced assist gas G is injected from the opening 402b of the nozzle 402 so as to cover a processing portion of the workpiece W.

Next, a laser beam L1 is irradiated from the laser torch 400 and is then condensed by the condenser lens 400, providing a laser beam L2 having a focal point proximal to the surface of the workpiece W. In this way, the laser beam L2 focused at a focal point proximal to the surface of the workpiece W melts and evaporates the workpiece W to form a molten pond 405.

Meanwhile, the molten material in the molten pond 45 is removed by the flow of the assist gas G by being oxidized and burnt by the assist gas G injected from the opening 402b. For example, Patent Document 1 describes a technology for processing the piercing hole H2 using a laser beam.

In the processing of the piercing hole H2, the excessive oxidation and burning of molten metal in the molten pond 405 of the workpiece W increases the diameter of the piercing hole H2, decreasing the yield of material.

Meanwhile, when processing the piercing hole using a pulsed oscillation laser beam, it is possible to improve the precision of the piercing hole diameter, but the processing efficiency may deteriorate greatly.

For example, Patent Document 2 describes a technology for improving the cutting precision (hole precision) of the piercing hole H2 when the piercing hole H2 is processed by the use of a laser beam.

However, the technology described in Patent Document 2 needs to provide a discharge groove for discharging the molten material in advance, and therefore, the size of the piercing hole is increased by the presence of the discharge groove.

That is, in the piercing processing, the excessive oxidation and burning of the workpiece W increases the piercing hole diameter, deteriorating the yield of material. Meanwhile, the piercing processing employing a pulsed oscillation laser beam can improve the precision of the piercing hole diameter but greatly deteriorates the processing efficiency.

For this reason, there is a desire for a laser piercing method and a processing apparatus enabling high precision processing of a piercing hole to a desired size while providing high processing efficiency.

[Patent Document 1] JP-A-2001-47268
[Patent Document 2] JP-B-3292021

DISCLOSURE OF THE INVENTION

The present invention has been made in view of the above-mentioned circumstances, and aims to provide a laser piercing method and a processing apparatus in which when processing a piercing hole in a metallic workpiece such as a steel plate, the piercing hole can be formed to a desired diameter with high processing efficiency while preventing the piercing hole diameter from increasing, and reducing the production cost.

In order to solve the above problems, the following aspects are provided.

According to Aspect 1 of the present invention, there is provided a laser piercing method in which a laser beam is irradiated onto a processing portion of a workpiece, and at the same time as the laser irradiation, an assist gas is injected toward the processing portion from a nozzle arranged concentric to the laser beam so that the processing portion is covered with the assist gas, thereby processing a piercing hole on the processing portion, wherein a piercing hole processing is performed while moving the nozzle within the range of 5 mm from a processing start point after the laser irradiation is started.

According to Aspect 1 of the present invention, there is provided a processing apparatus in which a laser beam is irradiated onto a processing portion of a workpiece, and at the same time as the laser irradiation, an assist gas is injected toward the processing portion from a nozzle arranged concentric to the laser beam so that the processing portion is covered with the assist gas, thereby processing a piercing hole on the processing portion, the apparatus including control means for performing a piercing hole processing while moving the nozzle within the range of 5 mm from a processing start point after the laser irradiation is started.

In the laser piercing method and the processing apparatus according to the above aspect of the present invention, when the irradiation of the laser beam is started and the processing of the piercing hole is started, the center of the nozzle is offset from the processing start point and is moved within the range of 5 mm from the processing start point. The center of the pressure distribution of the assist gas is offset from the center of the molten pond. As a result, the pressure distribution of the assist gas is eccentric to the center of the molten pond. Therefore, the pressure distribution of the assist gas in the opening of the molten pond is biased asymmetrical to the center of the molten pond, biasing the pressure balance in the opening of the molten pond.

When the pressure distribution of the assist gas is concentric to the center of the molten pond, the assist gas acts like a cover of the molten pond, and the molten material is stably maintained within the molten pond. However, when the pressure balance is biased, a high-pressure area where the molten material receives a higher pressure and a low-pressure area where the molten material receives a lower pressure are produced in the opening of the molten pond. As a result, the molten material is moved from the high-pressure area toward the low-pressure area by the pressure difference, which facilitates the discharge of the molten material to the outside of the molten pond.

As a result, the amount of the molten material stored in the molten pond decreases, suppressing excessive oxidation and burning and thus decreasing the piercing hole diameter.

In addition, because the nozzle moves around the processing start point within the range of 5 mm from the processing start point, the molten material in the molten pond is scattered and discharged toward the periphery of the molten pond. Heat emitted from the discharged molten material does not concentrate on a single point, suppressing a local overheating and an excessive oxidation reaction of the workpiece at the periphery of the piercing hole, and suppressing the piercing hole diameter from increasing.

As a result, in the case of continuous irradiation of a laser beam, it is possible to form a piercing hole with a high-precision hole diameter in a simple and secure manner while providing high productivity by the continuous irradiation.

Here, the reason the nozzle moves only within the range of 5 mm from the processing start point is that if separated by more than 5 mm from the processing start point, the piercing hole is increased, and thus there is no difference from the case where the nozzle is not moved at all.

The invention according to Aspect 2 of the present invention is the laser piercing method according to Aspect 1, in which the nozzle orbits around the processing start point.

The invention according to Aspect 8 of the present invention is the processing apparatus according to Aspect 7, in which the control means includes orbit control means for causing the nozzle to orbit around the processing start point.

In the laser piercing method and the processing apparatus according to the above aspect of the present invention, when the irradiation of the laser beam is started and the processing of the piercing hole is started, the center of the nozzle is offset from the processing start point and is allowed to orbit around the processing start point within the range of 5 mm from the processing start point. Until the processing of the piercing hole is completed after the nozzle is offset, the center of the pressure distribution of the assist gas is always offset from the center of the molten pond. As a result, the pressure balance in the opening of the molten pond is biased to facilitate the discharge of the molten material to the outside of the molten pond. Accordingly, the amount of the molten material stored in the molten pond decreases, suppressing excessive oxidation and burning and thus decreasing the piercing hole diameter.

The invention according to Aspect 3 of the present invention is the laser piercing method according to Aspect 1, in which the nozzle moves along a reciprocating trajectory.

The invention according to Aspect 9 of the present invention is the processing apparatus according to Aspect 7, in which the control means includes reciprocation control means for causing the nozzle to move along a reciprocating trajectory.

In the laser piercing method and the processing apparatus according to the above aspect of the present invention, after the processing of the piercing hole is started, the nozzle moves along a reciprocating trajectory within the range of 5 mm from the processing start point.

Because the nozzle moves along a simple reciprocating trajectory, the nozzle can be easily moved at a high speed. A great pressure difference is applied to the molten material in the molten pond, and the discharge of the molten material to the outside of the molten pond is facilitated by the great pressure difference. As a result, the amount of the molten material stored in the molten pond decreases, suppressing excessive oxidation and burning and thus decreasing the piercing hole diameter.

The invention according to Aspect 4 of the present invention is the laser piercing method according to Aspect 1, in which the nozzle moves in a zigzag manner.

The invention according to Aspect 10 of the present invention is the processing apparatus according to Aspect 7, in which the control means includes zigzag control means for causing the nozzle to move in a zigzag manner.

In the laser piercing method and the processing apparatus according to the above aspect of the present invention, after the processing of the piercing hole is started, the nozzle moves within the range of 5 mm from the processing start point in a zigzag manner.

Because the nozzle moves along a simple reciprocating trajectory in a zigzag manner while moving in the direction perpendicular to the reciprocating movement, the nozzle can be easily moved at a high speed. In addition, because the nozzle moves also in the direction perpendicular to the reciprocating movement, a pressure difference is applied to a wide range of the molten pond, applying a great pressure difference to the molten material in the molten pond and facilitating the discharge of the molten material to the outside of the molten pond. As a result, the amount of the molten material stored in the molten pond decreases, suppressing excessive oxidation and burning and thus decreasing the piercing hole diameter.

The invention according to Aspect 5 of the present invention is the laser piercing method according to any one of Aspects 1 to 4, in which the oxygen content C of the assist gas injected from the nozzle is determined on the basis of the thickness t of the processing portion subjected to the piercing hole processing by the following formulas.

For a plate thickness t in the range of $0 < t < 8$ mm, the oxygen content $C$ is in the range of $0 < C < 99.9$;

For a plate thickness t in the range of $8 \leq t < 13.5$ mm, the oxygen content $C$ is in the range of $0 < C \leq -1.65t + 111.2$; and For a plate thickness t in the range of $13.5 \leq t \leq 26.33$ mm, the oxygen content $C$ is in the range of $5.28t - 71.28 \leq C \leq -1.65t + 111.2$ In the above formulas, C denotes the oxygen content (volume %), and t denotes the thickness (mm) of the workpiece.

The invention according to Aspect 11 of the present invention is the processing apparatus according to any one of Aspects 7 to 10, in which the control means includes oxygen content adjustment means for determining the oxygen content C of the assist gas injected from the nozzle on the basis of the thickness of the processing portion subjected to the piercing hole processing.

In the laser piercing method and the processing apparatus according to the above aspect of the present invention, the oxygen content C of the assist gas injected from the nozzle is determined on the basis of the thickness t of the processing portion of the metallic workpiece subjected to the piercing hole processing, and the piercing hole processing is performed using the oxygen content C.

Therefore, it is possible to suppress excessive oxidation and burning of the workpiece and to thus decrease the amount of dross.

Accordingly, it is possible to form the piercing hole to the smaller diameter under various plate thicknesses t of the workpiece in a simple and secure manner without decreasing the yield of materials and the quality.

By adjusting the oxygen content of the assist gas G, even in the case of continuous irradiation of a laser beam, it is possible to form a small-diameter piercing hole in a simple and secure manner while suppressing excessive oxidation and burning and providing high productivity by the continuous irradiation.

In the case of continuous irradiation of a laser beam, by adjusting the oxygen content C of the assist gas, it is possible to suppress the excessive oxidation and burning and to thus form a piercing hole with a high-precision diameter in a simple and secure manner without relying on a skilled technician while providing high productivity by the continuous irradiation.

The invention according to Aspect 6 of the present invention is the laser piercing method according to any one of Aspects 1 to 5, in which after the piercing hole is penetrated, the nozzle is moved upward from the surface of the workpiece at the periphery of the piercing hole, and is allowed to orbit around the piercing hole while irradiating the laser beam to melt the dross again and injecting the assist gas from the nozzle, thereby removing the dross formed at the periphery of the piercing hole.

The invention according to Aspect 12 of the present invention is the processing apparatus according to any one of Aspects 7 to 11, in which the control means includes dross removal means for moving the nozzle upward from the surface of the workpiece at the periphery of the piercing hole after the piercing hole is penetrated, and allowing the nozzle to orbit around the piercing hole while irradiating the laser beam to melt the dross again and injecting the assist gas from the nozzle, thereby removing the dross formed at the periphery of the piercing hole.

In the laser piercing method and the processing apparatus according to the above aspect of the present invention, after the piercing hole is penetrated, the nozzle is moved upward from the surface of the workpiece at the periphery of the piercing hole, and is allowed to orbit around the piercing hole while irradiating the laser beam to melt the dross again and injecting the assist gas from the nozzle. The dross formed on the surface of the workpiece at the periphery of the piercing hole is melted so that the dross can be easily removed. The dross is removed by the injection pressure of the assist gas in a simple and efficient manner. As a result, it is possible to clean the surroundings of the piercing hole in a simple and efficient manner and to thus provide the piercing hole with a high quality.

The nozzle makes an orbiting movement and the assist gas is injected to the dross from a close distance while melting the dross by the irradiation of the laser beam. Therefore, it is possible to remove the dross in a secure manner even with a small flow volume of the assist gas. As a result, it is possible to greatly decrease the processing time and the processing cost.

According to Aspect 13 of the present invention, there is provided a laser piercing method in which a processing portion of a metallic workpiece is covered with an assist gas injected from a nozzle, and a laser beam is irradiated onto the processing portion, thereby performing a piercing processing on the metal plate, wherein the oxygen content of the assist gas is determined on the basis of the thickness of the processing portion.

In the laser piercing method according to the above aspect of the present invention, the oxygen content of the assist gas injected from the nozzle is determined on the basis of the thickness of the processing portion of the workpiece, and the piercing processing is performed using the oxygen content. Accordingly, it is possible to form the piercing hole to the smaller diameter under various plate thicknesses t of the workpiece in a simple and secure manner without decreasing the yield of materials and the quality.

In this case, by adjusting the oxygen content of the assist gas so as not to cause excessive oxidation and burning even in the case of using continuous irradiation of the laser beam, it is possible to form a piercing hole having a high precision diameter in a simple and secure manner while providing high productivity by the continuous irradiation.

The invention according to Aspect 14 of the present invention is the laser piercing method according to Aspect 13, in which the injection pressure of the assist gas is determined on the basis of the thickness of the processing portion.

In the laser piercing method according to the above aspect of the present invention, the injection pressure and the oxygen content of the assist gas are determined on the basis of the thickness of the processing portion, and the piercing processing is performed using the oxygen content and the injection pressure. Even when the piercing processing has proceeded to the vicinity of a processing end point in the thickness direction of the workpiece, the injection energy of the assist gas can reach the processing portion. The molten material can be sufficiently discharged from the piercing hole, and the piercing processing is smoothly performed, suppressing the self burning. Accordingly, it is possible to form the piercing hole to a desired diameter that improves the yield of materials and the quality.

The invention according to Aspect 15 of the present invention is the laser piercing method according to Aspect 14, in which the oxygen content C is determined by the following formulas:

For a plate thickness t in the range of $0<t<8$ mm, the oxygen content $C$ is in the range of $0<C<99.9$;

For a plate thickness t in the range of $8 \leq t<13.5$ mm, the oxygen content $C$ is in the range of $0<C \leq -1.65t+111.2$; and For a plate thickness t in the range of $13.5 \leq t \leq 26.33$ mm, the oxygen content $C$ is in the range of $5.28t-71.28 \leq C \leq -1.65t+111.2$ wherein the injection pressure P of the assist gas is determined by the following formulas:

For a plate thickness t in the range of 0<t<13 mm, the injection pressure P is in the range of
0.015≦P≦0.05; and For a plate thickness t in the range of 13≦t≦26.33 mm, the injection pressure P is in the range of 0.002t−
0.011≦P≦0.002t+0.024

In the above formulas, P denotes an injection pressure (MPa) of the assist gas, C denotes the oxygen content (volume %), and t denotes the thickness (mm) of the workpiece.

In the laser piercing method according to the above aspect of the present invention, when the laser beam is continuously irradiated onto the workpiece, the assist gas having an oxygen content C as determined by the formulas on the basis of the thickness t of the processing portion is injected at the injection pressure P. Accordingly, it is possible to suppress excessive oxidation and burning during the piercing operation.

As a result, it is possible to securely obtain a piercing hole having a diameter about ⅓ of the thickness t of the processing portion, in which the obtained piercing hole diameter is about 20 percent smaller than the conventional diameter. Because the piercing hole diameter is small, the amount of dross scattered from the piercing hole decreases. As a result, it is possible to obviate the concern of cutting errors due to the adhering dross or the concern of a fire due to the dross. Conventionally, it was only possible to obtain a plate thickness of 12 mm when the automatic operation of the piercing operation using continuous irradiation was not monitored. In the present invention, it is possible to obtain a plate thickness of about 16 mm without monitoring the automatic operation of the piercing operation using continuous irradiation.

By setting the injection pressure P to be not less than its lower limit, it is possible to discharge the molten material from the piercing hole and to thus suppress the molten material from remaining in the piercing hole. As a result, it is possible to suppress heat conduction from the molten metal to the workpiece and to thus improve the processing efficiency while suppressing the self burning. By setting the injection pressure P to be not more than its upper limit, it is possible to suppress excessive oxidation in the piercing hole and to suppress the amount of scattering dross from increasing. Accordingly, it is possible to provide a piercing hole having a desired diameter while improving the productivity and the processing efficiency.

In a so-called small-hole cutting, a piercing processing is performed on a metallic workpiece such as a steel plate and the surrounding is cut away to form a small hole. When cutting a small hole using a continuous irradiation in the small-diameter, the cuttable diameter is generally not less than about 1.5 times the plate thickness t. By decreasing the piercing hole diameter to ⅓ of the plate thickness, it was possible to cut a small hole having a diameter about 1.3 times greater than the plate thickness t using continuous laser irradiation.

When piercing a small hole having a diameter in the range of 1.3 and 1.5 times the thickness of the processing portion in the conventional manner by using pulsed laser irradiation, the conventional piercing required a long time about 20 to 30 times longer than that required by the piercing employing the continuous irradiation. By decreasing the piercing hole diameter to ⅓ of the thickness t of the processing portion, it is possible to perform the processing using continuous irradiation to form a small hole having a diameter in the range of 1.3 and 1.5 times the thickness t of the processing portion. Accordingly, it is possible to greatly decrease the processing time and the processing cost.

The invention according to Aspect 16 of the present invention is the laser piercing method according to Aspect 14, in which the oxygen content C is determined by the following formulas:

For a plate thickness t in the range of 0<t<12 mm, the oxygen content C is in the range of 0<C<85;

For a plate thickness t in the range of 12≦t≦22.76 mm, the oxygen content C is in the range of 5.71t−
68.52≦C≦−2.19t+111.28; and wherein the injection pressure P of the assist gas is determined by the following formulas:

For a plate thickness t in the range of 0<t<13 mm, the injection pressure P is in the range of
0.015≦P≦0.05; and For a plate thickness t in the range of 13≦t≦26.33 mm, the injection pressure P is in the range of 0.002t−
0.0111≦P≦0.002t+0.024

In the above formulas, P denotes an injection pressure (MPa) of the assist gas, C denotes the oxygen content (volume %), and t denotes the thickness (mm) of the workpiece.

In the laser piercing method according to the above aspect of the present invention, when the laser beam is continuously irradiated onto the workpiece, the assist gas having an oxygen content C as determined by the formulas on the basis of the thickness t of the processing portion as the workpiece is injected at the injection pressure P. Accordingly, it is possible to suppress excessive oxidation and burning during the piercing operation. As a result, it is possible to securely obtain a piercing hole having a diameter about ⅕ of the thickness t of the processing portion, in which the obtained piercing hole diameter is about 50 percent smaller than the conventional diameter.

Because the piercing hole diameter is small, the amount of dross scattered from the piercing hole decreases. And, it is possible to obtain a plate thickness of about 22 mm without monitoring the automatic operation of the piercing operation using continuous irradiation.

By decreasing the piercing hole diameter to ⅕ of the thickness t of the processing portion, it is possible to perform the processing using continuous irradiation to form a small hole having a diameter not less than 1.0 times the thickness t of the processing portion. Accordingly, it is possible to greatly decrease the processing time and the processing cost.

The invention according to Aspect 17 of the present invention is the laser piercing method according to Aspect 14, in which the oxygen content C is determined by the following formulas:

For a plate thickness t in the range of 0<t<12.0 mm, the oxygen content C is in the range of 0<C<10;

For a plate thickness t in the range of 12.0≦t≦13.3 mm, the oxygen content C is in the range of 0<C≦−
0.255t2+14.5t−127.2; and For a plate thickness t in the range of 13.3≦t≦26.33 mm, the oxygen content C is in the range of −0.255t2+
14.5t−147.2≦C≦−0.255t2+14.5t−127.2; and wherein the injection pressure P of the assist gas is determined by the following formulas:

For a plate thickness t in the range of 0<t<13 mm, the injection pressure P is in the range of
0.015<P<0.05; and For a plate thickness t in the range of $13 \leq t \leq 26.33$ mm, the injection pressure $P$ is in the range of $0.002t-0.011 \leq P \leq 0.002t+0.024$.

In the above formulas, P denotes an injection pressure (MPa) of the assist gas, C denotes the oxygen content (volume %), and t denotes the thickness (mm) of the workpiece.

In the laser piercing method according to the above aspect of the present invention, by adjusting the oxygen content C and the injection pressure P to fall within the range as defined in Aspect 5, it is possible to form a piercing hole having a minimum diameter at give thicknesses t of the processing portions in a simple and secure manner.

The oxygen content C that provides a minimum piercing hole diameter at given thicknesses t of the processing portions while providing a stable piercing processing without causing errors is determined by the following formulas:

For a plate thickness t in the range of $0<t<12.0$ mm, the oxygen content C is set to C=0; and For a plate thickness t in the range of $12.0 \leq t \leq 26.33$ mm, the oxygen content $C$ is set to $C=-0.255t2+14.5t-137.2$.

When the oxygen content C is greater than the value defined by the above formulas, the piercing processing becomes stable but the piercing hole diameter increases. When the oxygen content C is smaller than the value defined by the above formulas, the piercing hole diameter decreases but the piercing processing becomes unstable.

Considering the influence of a performance difference of the laser oscillator, an individual difference of the workpiece due to material, and temporal changes such as dust adhering on the laser oscillator, when the oxygen content of the assist gas is adjusted to fall within a ±10 percent range of the above-described formulas, it is possible to provide a piercing hole having a minimum hole diameter.

According to Aspect 18 of the present invention, there is provided a processing apparatus in which a processing portion of a metallic workpiece is covered with an assist gas injected from a nozzle, and a laser beam is irradiated onto the processing portion, thereby performing a piercing processing on the processing portion, the apparatus including adjustment means for adjusting the oxygen content of the assist gas on the basis of the thickness of the processing portion.

In the processing apparatus according to the above aspect of the present invention, the adjustment means adjusts the oxygen content of the assist gas injected from the nozzle on the basis of the thickness of the processing portion of the metallic workpiece, and the piercing processing is performed using the oxygen content. Accordingly, it is possible to form the piercing hole to the smaller diameter under various plate thicknesses t of the workpiece in a simple and secure manner without decreasing the yield of materials and the quality.

In this case, by adjusting the oxygen content of the assist gas so as not to cause excessive oxidation and burning even in the case of using continuous irradiation of the laser beam, it is possible to form a piercing hole having a high precision diameter in a simple and secure manner while providing high productivity by the continuous irradiation without relying on a skilled technician.

According to Aspect 19 of the present invention, there is provided a processing apparatus in which a processing portion of a metallic workpiece is covered with an assist gas injected from a nozzle, and a laser beam is irradiated onto the processing portion, thereby performing a piercing processing on the processing portion, the apparatus including a thickness input section for inputting the thickness of the processing portion; and adjustment means for adjusting the oxygen content of the assist gas, wherein the adjustment means automatically adjusts the oxygen content and the injection pressure of the assist gas on the basis of the thickness of the processing portion inputted from the thickness input section.

In the processing apparatus according to the above aspect of the present invention, the adjustment means automatically adjusts the injection pressure and the oxygen content of the assist gas on the basis of the thickness t of the processing portion, and the piercing processing is performed using the oxygen content and the injection pressure. Even when the piercing processing has proceeded to the vicinity of a processing end point in the thickness direction of the workpiece, the injection energy of the assist gas can reach the processing. The molten material can be sufficiently discharged from the piercing hole, and the piercing processing is smoothly performed, suppressing the self burning. Accordingly, it is possible to form the piercing hole to a desired diameter that improves the yield of materials and the quality on the basis of the thickness t of the processing portion of the workpiece. In addition, it is possible to perform the piercing by the continuous irradiation with high processing efficiency in a simple and secured manner without relying on a skilled technician.

The invention according to Aspect 20 of the present invention is the processing apparatus according to Aspect 18, in which the oxygen content C is adjusted by the following formulas:

For a plate thickness t in the range of $0<t<8$ mm, the oxygen content $C$ is in the range of $0<C<99.9$;

For a plate thickness t in the range of $8 \leq t<13.5$ mm, the oxygen content $C$ is in the range of $0<C \leq -1.65t+111.2$; and For a plate thickness t in the range of $13.5 \leq t \leq 26.33$ mm, the oxygen content $C$ is in the range of $5.28t-71.28 \leq C \leq -1.65t+111.2$ wherein the injection pressure P of the assist gas is adjusted by the following formulas:

For a plate thickness t in the range of $0<t<13$ mm, the injection pressure P is in the range of $0.015 \leq P \leq 0.05$; and For a plate thickness t in the range of $13 \leq t \leq 26.33$ mm, the injection pressure $P$ is in the range of $0.002t-0.011 \leq P \leq 0.002t+0.024$ In the above formulas, P denotes an injection pressure (MPa) of the assist gas, C denotes the oxygen content (volume %), and t denotes the thickness (mm) of the workpiece.

In the processing apparatus according to the above aspect of the present invention, when the laser beam is continuously irradiated onto the workpiece, the assist gas having an oxygen content C as determined by the formulas on the basis of the thickness t of the processing portion is injected at the injection pressure P. Accordingly, it is possible to suppress excessive oxidation and burning during the piercing operation. As a result, it is possible to securely obtain a piercing hole having a diameter about ⅓ of the thickness t of the processing portion, in which the obtained piercing hole diameter is about 20 percent smaller than the conventional diameter.

Because the piercing hole diameter is small, the amount of dross scattered from the piercing hole decreases. As a result, it is possible to obviate the concern of cutting errors due to the adhering dross or the concern of a fire due to the dross. Conventionally, it was only possible to obtain a plate thickness of 12 mm when the automatic operation of the piercing operation using continuous irradiation was not monitored. In the present invention, it is possible to obtain a plate thickness of about 16 mm without monitoring the automatic operation of the piercing operation using continuous irradiation.

By setting the injection pressure P to be not less than its lower limit, it is possible to discharge the molten material from the piercing hole and to thus suppress the molten material from remaining in the piercing hole. As a result, it is possible to suppress heat conduction from the molten metal to the workpiece and to thus improve the processing efficiency while suppressing the self burning. By setting the injection pressure P to be not more than its upper limit, it is possible to suppress excessive oxidation in the piercing hole and to suppress the amount of scattering dross from increasing. Accordingly, it is possible to provide a piercing hole having a desired diameter while improving the productivity and the processing efficiency.

By decreasing the piercing hole diameter to ⅓ of the plate thickness, it was possible to cut a small hole having a diameter about 1.3 times greater than the plate thickness t using continuous laser irradiation. Accordingly, it is possible to greatly decrease the processing time and the processing cost.

The invention according to Aspect 21 of the present invention is the processing apparatus according to Aspect 19, in which the oxygen content C is adjusted by the following formulas:

For a plate thickness t in the range of 0<t<12 mm, the oxygen content C is in the range of 0<C<85;

For a plate thickness t in the range of 12≦t≦22.76 mm, the oxygen content $C$ is in the range of $5.71t-68.52 \leq C \leq -2.19t+111.28$; and wherein the injection pressure P of the assist gas is determined by the following formulas:

For a plate thickness t in the range of 0<t<13 mm, the injection pressure P is in the range of 0.015≦P≦0.05; and For a plate thickness t in the range of 13≦t≦26.33 mm, the injection pressure $P$ is in the range of $0.002t-0.011 \leq P \leq 0.002t+0.024$ In the above formulas, P denotes an injection pressure (MPa) of the assist gas, C denotes the oxygen content (volume %), and t denotes the thickness (mm) of the workpiece.

In the processing apparatus according to the above aspect of the present invention, when the laser beam is continuously irradiated onto the workpiece, the assist gas having an oxygen content C as determined by the formulas on the basis of the thickness t of the processing portion as the workpiece is injected at the injection pressure P. Accordingly, it is possible to suppress excessive oxidation and burning during the piercing operation. As a result, it is possible to securely obtain a piercing hole having a diameter about ⅕ of the thickness t of the processing portion, in which the obtained piercing hole diameter is about 50 percent smaller than the conventional diameter.

Because the piercing hole diameter is small, the amount of dross scattered from the piercing hole decreases. And, it is possible to obtain a plate thickness of about 22 mm without monitoring the automatic operation of the piercing operation using continuous irradiation.

By decreasing the piercing hole diameter to ⅕ of the thickness t of the processing portion, it is possible to perform the processing using continuous irradiation to form a small hole having a diameter not less than 1.0 times the thickness t of the processing portion. Accordingly, it is possible to greatly decrease the processing time and the processing cost.

The invention according to Aspect 22 of the present invention is the processing apparatus according to Aspect 19, in which the oxygen content C is adjusted by the following formulas:

For a plate thickness t in the range of 0<t<12.0 mm, the oxygen content C is in the range of 0<C<10;

For a plate thickness t in the range of 12.0≦t≦13.3 mm, the oxygen content $C$ is in the range of $0 < C \leq -0.255t^2+14.5t-127.2$; and For a plate thickness t in the range of 13.3≦t≦26.33 mm, the oxygen content $C$ is in the range of $-0.255t^2+14.5t-147.2 \leq C \leq -0.255t^2+14.5t-127.2$; and wherein the injection pressure P of the assist gas is adjusted by the following formulas:

For a plate thickness t in the range of 0<t<13 mm, the injection pressure P is in the range of 0.015≦P≦0.05; and For a plate thickness t in the range of 13≦t≦26.33 mm, the injection pressure $P$ is in the range of $0.002t-0.011 \leq P \leq 0.002t+0.024$ In the above formulas, P denotes an injection pressure (MPa) of the assist gas, C denotes the oxygen content (volume %), and t denotes the thickness (mm) of the workpiece.

In the processing apparatus according to the above aspect of the present invention, by adjusting the oxygen content C and the injection pressure P to fall within the above-described range, it is possible to form a piercing hole having a minimum diameter at given thicknesses t of the processing portions in a simple and secure manner.

ADVANTAGES OF THE INVENTION

As a result of using the laser piercing method and the processing apparatus according to the present invention, it is possible to provide a piercing hole having a desired diameter with high efficiency and high precision while suppressing excessive oxidation and to thus decrease the production cost.

BRIEF DESCRIPTION OF THE DRAWINGS

FIG. 5 is a diagram showing the trajectory of a laser torch according to the first embodiment of the present invention, in which

FIG. 6 is a diagram showing a pressure distribution of an assist gas when the nozzle is offset from the center of a molten pond according to the first embodiment of the present invention, in which

FIG. 7 is a diagram showing a pressure distribution of the assist gas according to the present invention.

DESCRIPTION OF REFERENCE NUMERALS AND SIGNS

H: PIERCING HOLE
L1, L2: LASER BEAM
t: PLATE THICKNESS (THICKNESS OF PROCESSING PORTION)
OH: AXIAL LINE OF PIERCING HOLE
G: ASSIST GAS
W: STEEL PLATE (METALLIC WORKPIECE, PROCESSING PORTION)
C: OXYGEN CONTENT
1, 200: PROCESSING APPARATUS
2: LASER TORCH
3, 247: NOZZLE
10: PIERCING CONTROL SECTION (CONTROL MEANS)
11: NOZZLE MOVEMENT CONTROL SECTION
20, 211: OXYGEN CONTENT ADJUSTMENT SECTION (OXYGEN CONTENT ADJUSTMENT MEANS)
31a, 231: PLATE THICKNESS INPUT SECTION
40: DROSS REMOVAL CONTROL SECTION (DROSS REMOVAL CONTROL MEANS)
60: MOLTEN POND
64: MOLTEN MATERIAL
210: PIERCING REGULATING SECTION (REGULATING MEANS)

BEST MODE FOR CARRYING OUT THE INVENTION

Hereinafter, a first embodiment of the present invention will be described with reference to the accompanying drawings.

Figure 1:
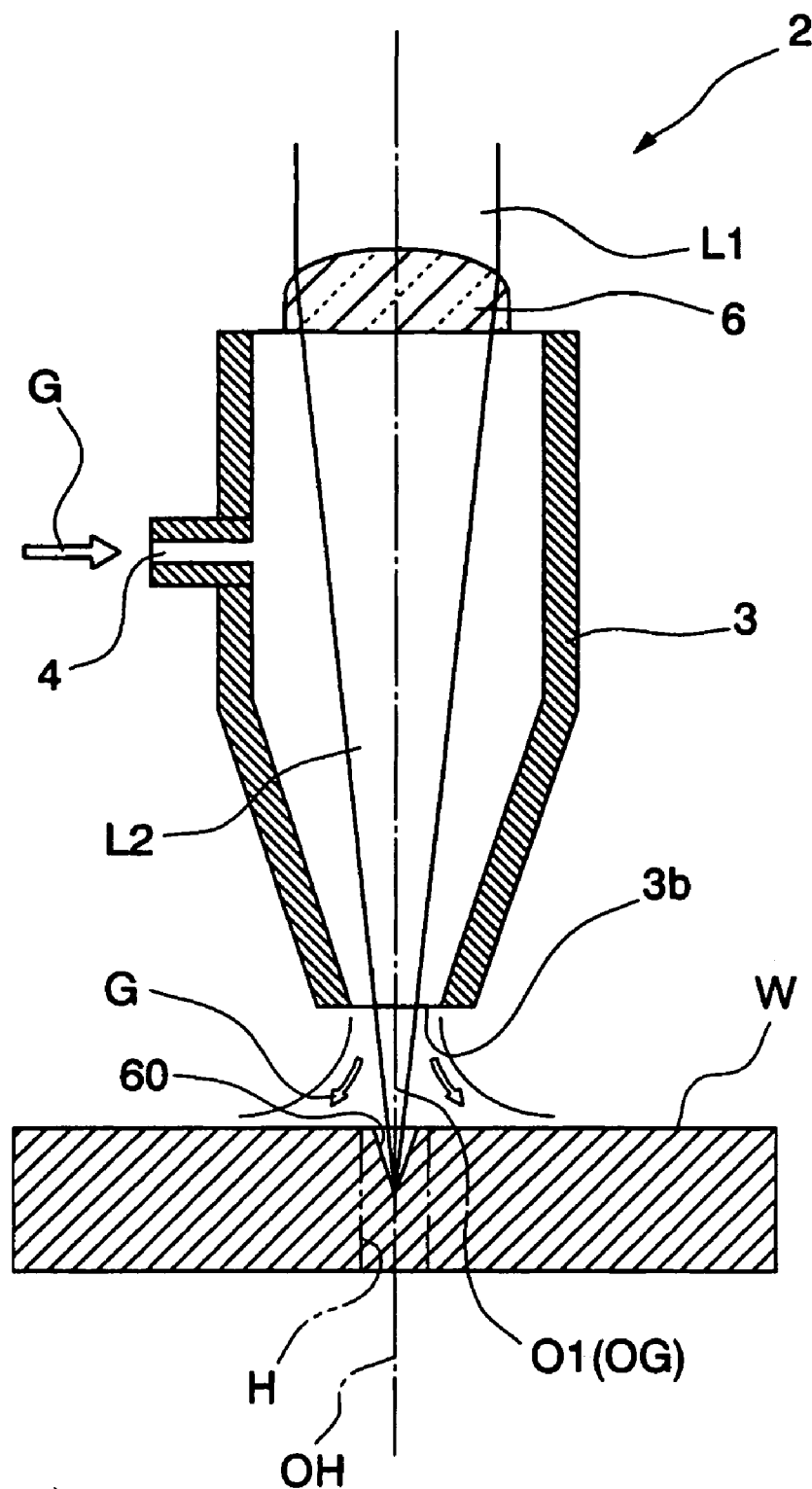
FIG. 1 is a diagram showing piercing hole processing according to a first embodiment of the present invention, in which a nozzle is placed at a processing start point.

FIG. 1 shows a laser torch 2 according to a first embodiment, showing the state in which a piercing hole H is processed. The laser torch 2 includes a nozzle 3 and a condenser lens 6. The nozzle has a cylindrical shape, and is configured to condense a laser beam L1 having passed through the condenser lens 6 and to output a laser beam L2 from an injection port 3b.

The axial line O1 of the nozzle 3 is coaxial to the optical axis of the laser beam L2 and is also coaxial to the central axis of the pressure distribution of an assist gas G injected from the nozzle 3.

The assist gas G is introduced from an inlet port 4 into the nozzle 3 and is injected from the injection port 3b to react with a workpiece W which was melted and evaporated by the laser beam L2, oxidizing and burning the workpiece W.

In the present embodiment, a processing start point at the time of processing a piercing hole in the workpiece W is substantially identical to the center of the piercing hole H. Therefore, the axial line OH, which passes through the center of the piercing hole H and extends in the extending direction of the piercing hole H, also passes through the processing start point. Accordingly, it is possible to specify the processing start point on the surface of the workpiece W.

FIG. 1 shows the nozzle 3 immediately after the laser beam L2 is irradiated to process the piercing hole H. The assist gas G is injected from the injection port 3b of the nozzle 3 toward the workpiece W opposed to the injection port 3b, covering a processing portion of the workpiece W with the assist gas G, and the laser beam L2 is irradiated onto the workpiece W, melting and evaporating the workpiece W. At this time, a molten pond 60 is formed in the melted workpiece W and then oxidized and burnt by the assist gas G, and molten material in the molten pond 60 is removed by the flow of the assist gas G. In this case, the workpiece W is melted, evaporated, oxidized and burnt to form dross. The dross is stored in the molten pond 60 as the molten material or adheres to the periphery of the piercing hole H of the workpiece W by the flow of the assist gas G.

Figure 2:
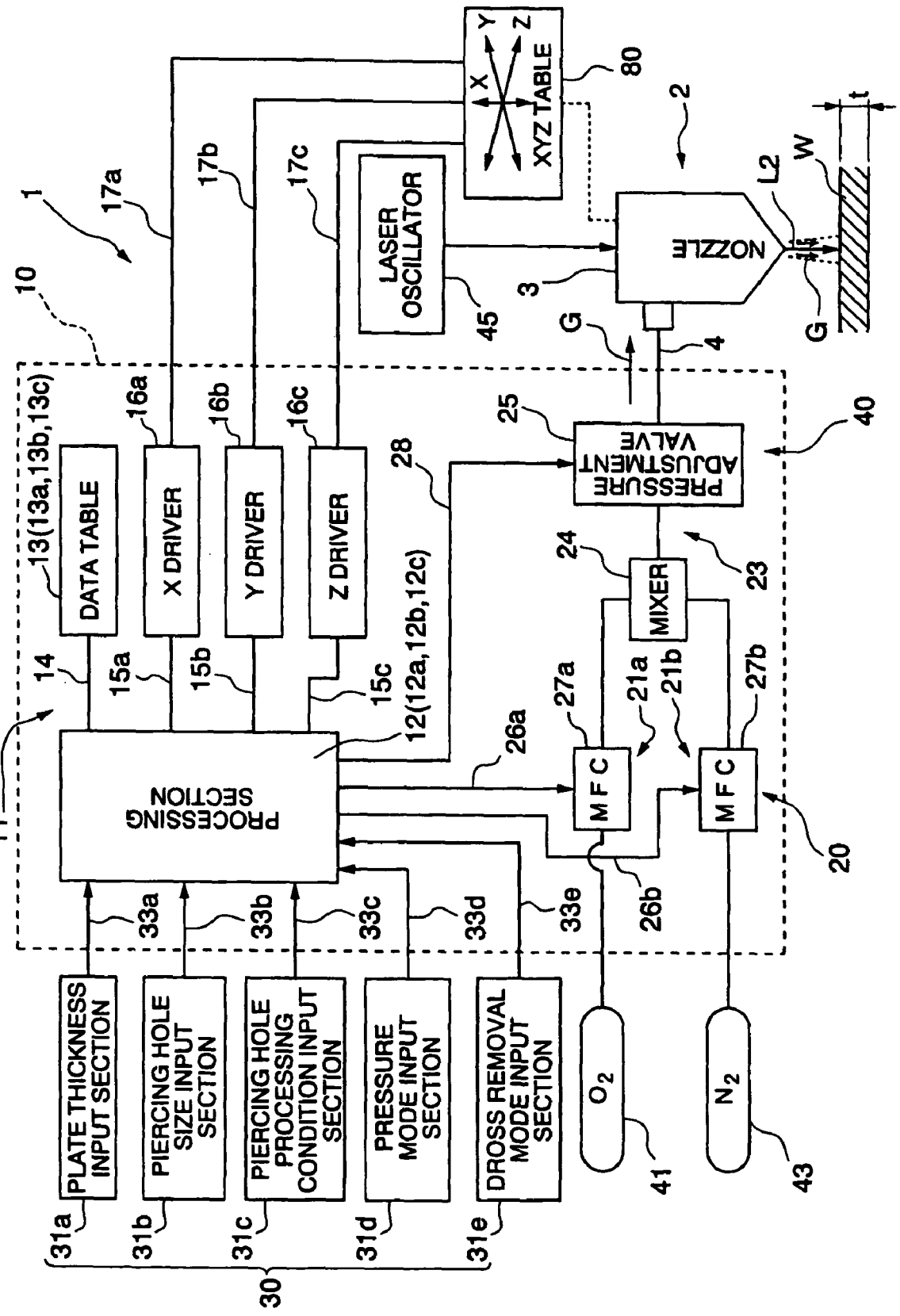
FIG. 2 is a diagram showing a schematic structure of a processing apparatus according to the first embodiment of the present invention.

FIG. 2 is a schematic diagram of a processing apparatus according to the first embodiment of the present invention. In FIG. 2, reference numeral 1 denotes a processing apparatus, reference numeral 2 denotes a laser torch, and reference numeral 10 denotes a piercing control section (control means).

The processing apparatus 1 includes a laser torch 2, a piercing control section 10, a processing data input section 30, an oxygen supply source 41, a nitrogen supply source 43, a laser oscillator 45, and a driving member 80. For example, the driving member 80 is an XYZ table that moves the position of the injection port of the nozzle 3 provided to the laser torch 2 in the X, Y, and Z coordinate directions in a 3-dimensional space. In the present embodiment, the surface of the workpiece is parallel to the XY coordinate direction, and the Z direction corresponds to the height direction of the workpiece.

The processing data input section 30 includes a plate thickness input section (thickness input section) 31a, a piercing hole size input section 31b, a piercing hole processing condition input section 31c, a pressure mode input section 31d, and a dross removal mode input section 31e.

The piercing control section 10 includes a processing section 12, a data table 13, a nozzle movement control section 11, an oxygen content adjustment section (oxygen content adjustment means) 20, and a dross removal control section (dross removal means) 40. The piercing control section 10 determines a suitable processing condition on the basis of the input data inputted from the processing data input section 30, and drives the driving member 80 to move the laser torch 2 in the X, Y, and Z directions in the 3-dimensional space and to thus move the position of the injection port 3b of the nozzle 3, so that the assist gas G is supplied to the nozzle 3 through the inlet port 4.

The processing section 12 is composed of processing sections 12a, 12b, and 12c, which are respectively assigned to the nozzle movement control section 11, the oxygen content adjustment section 20, and the dross removal control section. Similarly, the data table 13 is composed of data tables 13a, 13b, and 13c, which are respectively assigned to the nozzle movement control section 11, the oxygen content adjustment section 20, and the dross removal control section.

In the present embodiment, the assist gas G is produced by mixing oxygen from the oxygen supply source 41 with nitrogen from the nitrogen supply source 43 while adjusting their amounts such that the oxygen content C of the produced assist gas G is suitable for processing the piercing hole H to a desired diameter. In addition, according to the needs, the assist gas G is injected from the nozzle 3 in order to remove the dross deposited on the surface of the workpiece W at the periphery of the piercing hole H.

The nozzle movement control section 11 includes the processing section 12a, the data table 13a, an X driver 16a for driving the driving member 80 to control the X-coordinate position of the laser torch 2, and a Y driver 16b for driving the driving member 80 to control the Y-coordinate position of the laser torch 2, and a Z driver 16c for driving the driving member 80 to control the Z-coordinate position of the laser torch 2. The processing section 12a transmits an instruction signal to the X driver 16a, the Y driver 16b, and the Z driver 16c via cables 15a, 15b, and 15c. The X driver 16a, the Y driver 16b, and the Z driver 16c supply electric power for moving the X, Y, and Z-coordinate positions to the driving member 80 via cables 17a, 17b, and 17c.

The processing section 12a acquires data suitable for providing a piercing hole having a desired diameter to a steel plate W with a plate thickness t to be pierced, from the data table 13 a via a signal cable 14 on the basis of the data regarding the plate thickness t and the data regarding the piercing hole diameter d1 inputted and supplied from the processing data input section 30. Examples of the data acquired by the processing section 12a include the amount of eccentricity of the laser torch 2 (i.e., the eccentricity of the axial line O1 of the nozzle 3, or the central axis OG of the pressure distribution of the assist gas G), an offset speed of the laser torch 2, the number of orbit cycles, an orbit speed, and the like. The data acquired by the processing section are supplied to the X driver 16a, the Y driver 16b, and the Z driver 16c.

Here, the movement of the laser torch 2 means that the axial line O1 of the nozzle 3 and the central axis OG of the assist gas G are moved.

The driving member 80 is physically connected to the laser torch 2 such that when the driving member 80 is driven, the laser torch 2 (and the nozzle 3) is moved in the X, Y, and Z coordinate directions.

In the first embodiment, the data table 13a stores the mode of a movement trajectory of the laser torch 2 corresponding to the plate thickness t inputted from the piercing processing condition input section 31c of the processing data input section 30 and to the piercing hole diameter d1. Examples of the mode are as follows:

(I) an orbit trajectory (circular or polygonal, and the size), a torch speed, the number of orbit cycles, an orbit speed, and the like, which constitute an orbit control means;

(II) a reciprocating trajectory (a reciprocating stroke), a torch speed, the number of reciprocating movements, and the like, which constitute a reciprocation control means; and (III) a zigzag movement, which is a combination of a reciprocating movement and a movement in a direction perpendicular to the reciprocating movement (in this case, a reciprocating stroke or the amount of movement in the perpendicular direction), a torch speed, the number of reciprocating movements, and the like, which constitute a zigzag control means.

In this case, the reciprocating movement of the laser torch 2 in the examples (II) and (III) completes one cycle when the offset laser torch 2 returns to the processing start point after traveling along the reciprocating stroke. However, when moving the laser torch 2 in the processing of the piercing hole, it is not necessary to move the laser torch 2 to the position corresponding to the processing start point. Therefore, for the movement from the processing start point to one end of the reciprocating stroke and the movement from the one end back to the processing start point, the number of reciprocating cycles becomes ¼ cycles.

The data table 13a may store other movement trajectories; for example, in the case of the zigzag movement, the specific shape of the movement, such as "Z" may be stored in the data table 13a.

The laser torch 2 is moved in the X and Y-coordinate directions in the 3-dimensional space on the basis of the data inputted from the plate thickness input section 31a and the piercing hole size input section 31b of the processing data input section 30. As a result, the central axis OG of the pressure distribution of the assist gas G injected from the injection port 3b of the nozzle 3 is moved, and the pressure distribution of the assist gas G applied to an opening 61 of the molten pond 60 is offset from the processing start point. Thus, the pressure distribution of the assist gas G in the opening 61 of the molten pond 60 becomes asymmetric to the center of the molten pond 60, biasing the pressure balance in the opening of the molten pond 60.

The oxygen content adjustment section (oxygen content adjustment means) 20 includes the processing section 12b, the data table 13b, an oxygen flow rate adjustment circuit 21a, a nitrogen flow rate adjustment circuit 21b, a mixer 24, and a pressure adjustment valve 25. The processing section 12b is connected to the data table 13b, the oxygen flow rate adjustment circuit 21a, the nitrogen flow rate adjustment circuit 21b, and the pressure adjustment valve 25 via signal cables 26a, 26b, and 28, respectively.

The data table 13b stores control data for providing the assist gas G with a predetermined oxygen content and a predetermined injection pressure to the oxygen flow rate adjustment circuit 21a, the nitrogen flow rate adjustment circuit 21b, and the pressure adjustment valve 25.

The oxygen flow rate adjustment circuit 21a and the nitrogen flow rate adjustment circuit 21b are connected to the oxygen supply source 41 and the nitrogen supply source 43, respectively. The oxygen supply source 41 and the nitrogen supply source 43 store liquid oxygen and liquid nitrogen, respectively. The liquid oxygen and the liquid nitrogen are vaporized and are then supplied to the oxygen flow rate adjustment circuit 21a and the nitrogen flow rate adjustment circuit 21b.

The oxygen flow rate adjustment circuit 21a includes a mass flow controller 27a and a pipeline and is connected between the oxygen supply source 41 and the mixer 24. The flow rate of the oxygen supplied from the oxygen supply source 41 through the pipeline is adjusted by the mass flow controller 27a.

The nitrogen flow rate adjustment circuit 21b includes a mass flow controller 27b and a pipeline and is connected between the nitrogen supply source 43 and the mixer 24. The flow rate of the nitrogen supplied from the nitrogen supply source 43 through the pipeline is adjusted by the mass flow controller 27b.

The oxygen and nitrogen of which the flow rates are adjusted by the mass flow controllers 27a and 27b are supplied to and mixed by the mixer 24, producing an assist gas G with a predetermined oxygen content. The produced assist gas G is supplied to the nozzle 3 through the inlet port 4.

For example, according to the needs of providing the assist gas G having a predetermined injection pressure P to the nozzle 3, the assist gas G is controlled by the pressure adjustment valve 25 on the basis of the control data supplied from the processing section 12a so as to provide a predetermined pressure corresponding to the injection pressure P. In the present embodiment, the nozzle 3 is provided with a storage section for storing the assist gas G having a sufficiently large volume relative to the injection port. The injection pressure P of the assist gas G in the injection port is maintained at substantially the same as the pressure of the assist gas G supplied from the pressure adjustment valve 25.

In the present embodiment, the control data for controlling the oxygen flow rate adjustment circuit 21a and the nitrogen flow rate adjustment circuit 21b includes data regarding opening ratios of the mass flow controller 27a and 27b.

According to the needs, when the pressure mode input section 31d receives instructions on adjusting the pressure of the assist gas, in order to inject the assist gas G having an injection pressure G corresponding to the thickness t of the processing portion of the workpiece W inputted from the plate thickness input section 31a in response to the signal from the pressure mode input section 31d, the processing section 12a acquires, from the data table 13, the control data for supplying the assist gas G having a pressure corresponding to the injection pressure P to the nozzle 3 through the pressure adjustment valve 25, and supplies the acquired control data to the pressure adjustment valve 25 via the signal cable 28.

The dross removal control section (dross removal means) 40 includes the processing section 12c, the data table 13c, the X driver 16a, the Y driver 16b, and the Z driver 16c. The processing section 12a transmits a signal to the X driver 16a, the Y driver 16b, and the Z driver 16c. The X driver 16a, the Y driver 16b, and the Z driver 16c supply electric power to the driving member 80.

The data table 13c stores control data including the distance (in the present embodiment, one half of the diameter d2 of the circular trajectory) offset from the axial line OH of the piercing hole H, the height from the surface of the workpiece W, an orbit speed of the nozzle, the number of orbit cycles, an orbit trajectory, and the like.

The processing data input section 30 includes the plate thickness input section 31a, the piercing hole size input section 31b, the piercing hole processing condition input section 31c, the pressure mode input section 31d, and the dross removal mode input section 31e, which are connected to the processing section 12 via data cables 33a, 33b, 33c, 33d, and 33e, respectively.

The plate thickness input section 31a is used to input data regarding the plate thickness (thickness of a processing portion) t of the workpiece W such as a steel plate (metallic workpiece) W.

The piercing hole size input section 31b is used to input data, among processing data for piercing processing, regarding the piercing hole diameter d1 with respect to the plate thickness t of the steel plate W.

The piercing hole processing condition input section 31c is used to input data for moving the laser torch 2 in the processing of the piercing hole. Examples of the data are as follows:

(I) an orbit trajectory (circular or polygonal, and the size), a torch speed, the number of orbit cycles, an orbit speed, and the like, which constitute an orbit control means;

(II) a reciprocating trajectory (a reciprocating stroke), a torch speed, the number of reciprocating movements, and the like, which constitute a reciprocation control means; and (III) a zigzag movement, which is a combination of a reciprocating movement and a movement in a direction perpendicular to the reciprocating movement (in this case, a reciprocating stroke or the amount of movement in the perpendicular direction), a torch speed, the number of reciprocating movements, and the like, which constitute a zigzag control means.

The pressure mode input section 31d is used to input instruction data for instructing the processing section 12 to increase (or decrease) the supply pressure of the assist gas G supplied to the nozzle 3 to inject the assist gas G at a high (or low) injection pressure from the nozzle 3 in order to discharge the molten material in the piercing hole produced during the piercing processing to the outside of the piercing hole so that no molten material remains in the piercing hole. The pressure mode input section 31d transmits the instruction data to the processing unit 12.

The dross removal mode input section 31e is used to input instructions on whether the dross removal control section is to be operated after the processing of the piercing hole is performed.

Figure 5A:
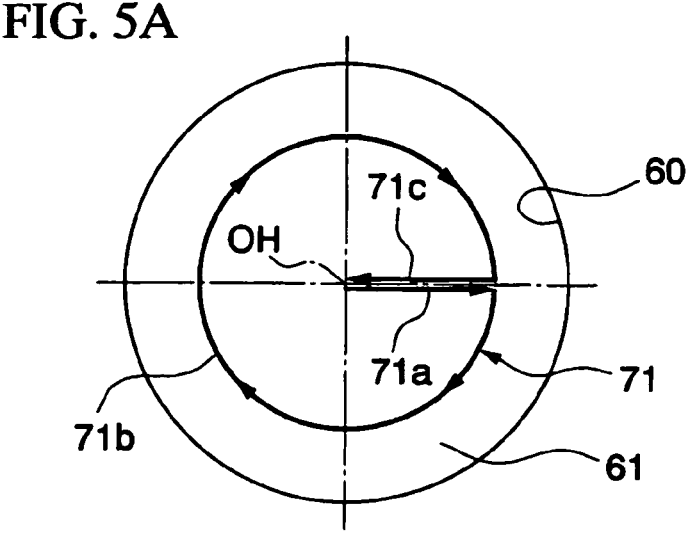
FIG. 5A shows a circular trajectory.

Next, operations of the processing apparatus 1 according to the first embodiment will be described. In the following section, description will be made for the case of a circular orbit trajectory 71 shown in FIG. 5A.

Nozzle Movement Control Section

First, an operator operates an operation unit (not shown) to move the laser torch 2 in the X and Y-coordinate directions defined by two perpendicular directions on a plane parallel to the steel plate W so as to be placed at an intended processing position (corresponding to the processing start point) of the piercing hole H.

Figure 3:
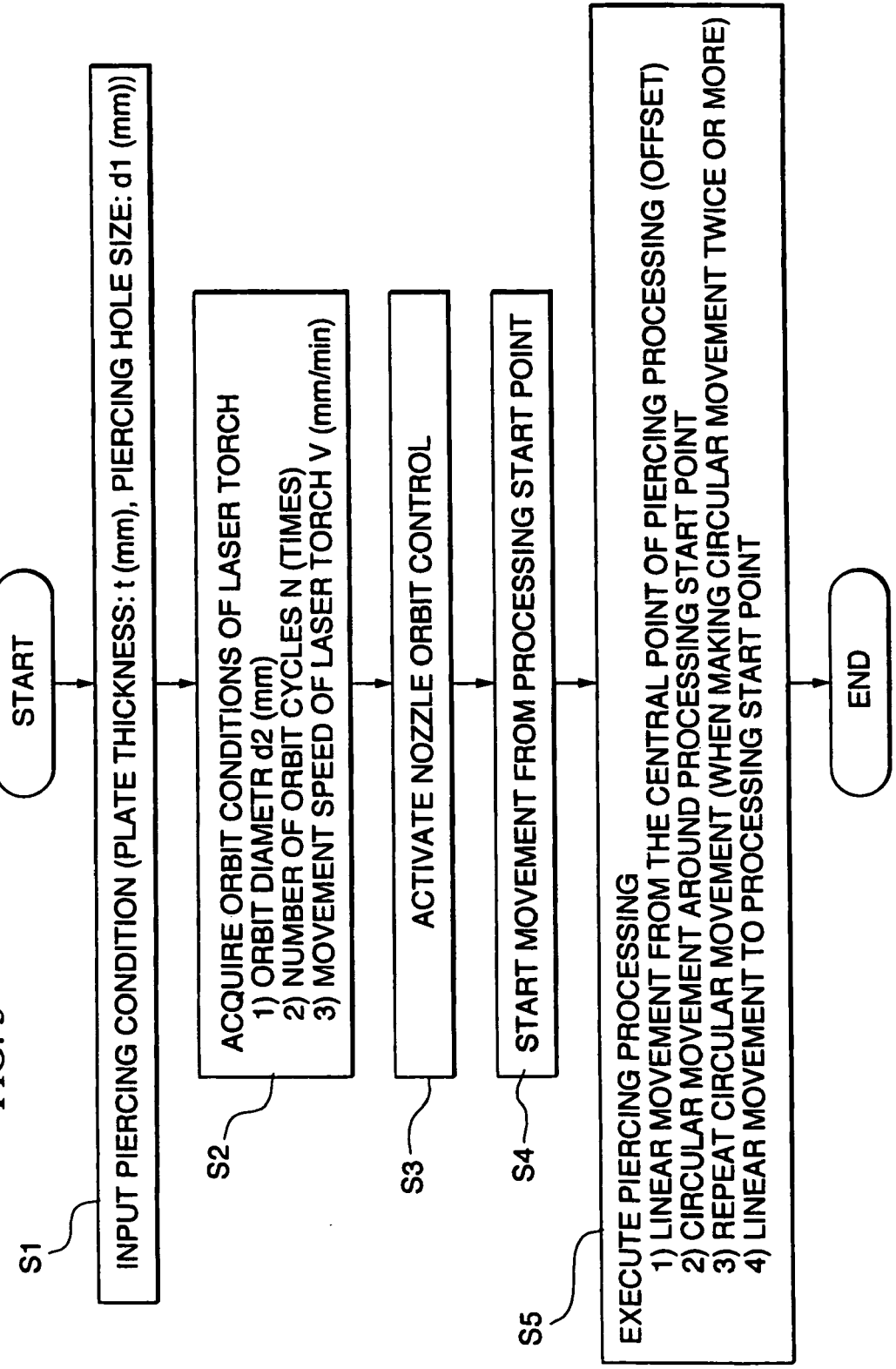
FIG. 3 is a diagram showing the flow of the piercing hole processing according to the first embodiment of the present invention.

Next, after the piercing hole processing conditions are set, data regarding a plate thickness t and a piercing hole diameter d1 are inputted to the plate thickness input section 31a and the piercing hole size input section 31b of the processing data input section 30 (Step S1 in FIG. 3).

In this case, a human operator may manually control and input data regarding an orbiting movement, a reciprocating movement, and a zigzag movement to the piercing hole size processing condition input section 31c.

The data regarding the plate thickness t and the piercing hole diameter d1 inputted to the plate thickness input section 31a and the piercing hole size input section 31b are transmitted to the processing section 12 via data cables 33a and 33b, respectively.

The processing section 12a transmits the data regarding the plate thickness t and the piercing hole diameter d1 inputted to the plate thickness input section 31a and the piercing hole size input section 31b to the data table 13a, and acquires data regarding the control of nozzle position corresponding to the plate thickness t and the piercing hole diameter d1 from the data table 13a (Step S2 in FIG. 3).

In the case in which the laser torch 2 makes an orbiting movement, examples of the data that the processing section 12a acquires from the data table 13a include an orbit trajectory (see FIG. 5A) of the axial line O1 of the laser torch 2, the amount of offset, an orbit speed, the number of orbit cycles, and the like.

The processing section 12 calculates time and position information for moving the driving member 80 on the basis of the data acquired from the data table 13. When an activation switch (not shown) is activated (ON) to start the piercing hole processing, the calculation results are transmitted to the X driver 16a, the Y driver 16b, and the Z driver 16c via the signal cables 15a, 15b, and 15c, respectively, driving the drivers.

In the first embodiment, the X driver 16a and the Y driver 16b move the driving member 80 in the X and Y-coordinate directions to cause the axial line O1 of the laser torch 2 to make an orbiting movement around the processing start point.

When the activation switch is activated (ON), the laser oscillator 45 is activated to irradiate a laser beam L1. The laser beam L1 is guided by the condenser lens 6 through an optical path (not shown) and is outputted as a laser beam L2 after passing through the condenser lens 6. Finally, the laser beam L2 is irradiated onto the steel plate W.

At this time, an assist gas G is introduced into the nozzle 3 of the laser torch 2 before the irradiation of the laser beam L1 and is injected toward the processing portion of the steel plate W, forming a coating of the assist gas G between the nozzle 3 and the steel plate W.

When the laser beam L2 is irradiated from the laser torch 2, the nozzle 3 starts injecting the assist gas G, initiating the piercing hole processing. At the same time, the laser torch 2 orbit control (orbit control means) is activated (Step S3 in FIG. 3).

The laser beam L2 is irradiated onto a portion of the steel plate W covered by the coating of the assist gas G, heating and melting the metal plate W. When the steel plate W melts down, the molten pond 60 is formed in the processing start point and the molten material 64 is stored in the molten pond 60.

At this time, the molten material 64 is oxidized and burnt by the assist gas G and the coating of the assist gas G.

This melting and oxidation reaction continues until the piercing hole H goes through the other side.

When the nozzle orbit control is initiated, the laser torch 2 starts its movement in accordance with the instructions from the processing section 12b (Step S4 in FIG. 3).

Figure 4:
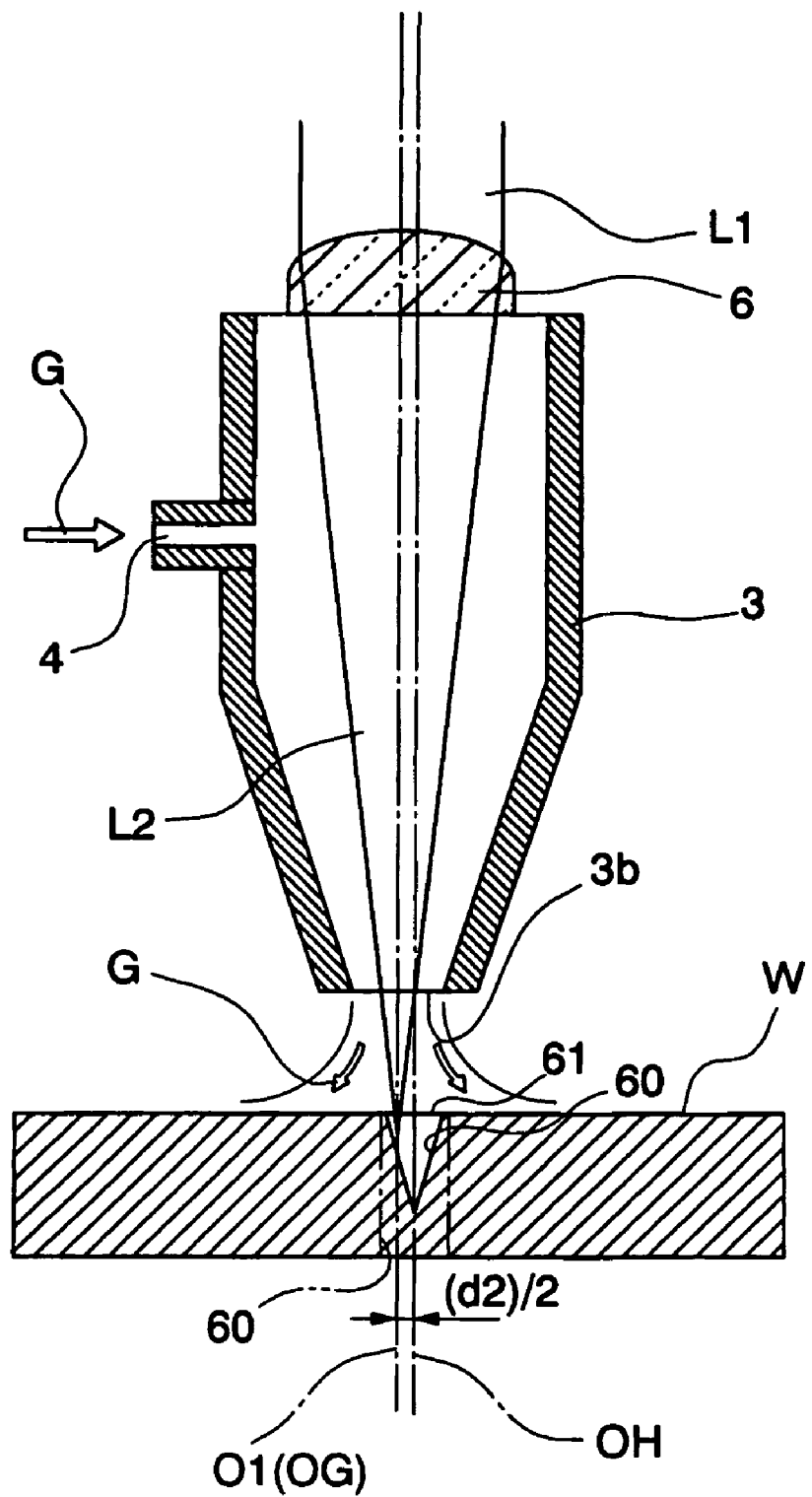
FIG. 4 is a diagram showing laser piercing processing according to the first embodiment of the present invention, in which a nozzle is offset.

When moving along the orbiting movement trajectory 71, the laser torch 2 is offset from the processing start point by a distance corresponding to the radius of the circle orbiting around the processing start point. As shown in FIG. 4, the piercing hole processing is performed in a state that the axial line O1 of the laser torch is eccentric to the processing start point (Step S5-1 in FIG. 3).

Subsequently, the laser torch makes a circular movement around the processing start point for a predetermined number N of orbit cycles (Steps S5-2 and S5-3 in FIG. 3).

Thereafter, the laser torch returns to the processing start point (Step S5-4 in FIG. 3).

When moving along the orbiting movement trajectory 71, within the range of the molten pond 60, the axial line O1 of the laser torch 2 is first offset to be moved from the processing start point along a straight line 71a and then orbits around the processing start point along the circular trajectory 71b.

The orbiting movement may be made for a plurality of times in accordance with the instructions of the processing section 12b. When the orbiting movement stops, the laser torch returns to the processing start point along a straight line 71c.

A suitable diameter d2 of the circular trajectory is from about 0.1 mm to about 10 mm.

In the meantime, the laser torch 2 continuously irradiates the laser beam L2 while injecting the assist gas G from the nozzle 3, and the penetration of the piercing hole H is completed before the laser torch 2 returns to the processing start point.

The time T (sec) required for the orbiting movement of the laser torch 2, the number N of orbit cycles, the orbit speed V (mm/min), and the diameter d2 (mm) of the circular trajectory are expressed by the following expression.

$$T(\text{sec}) = ((d2) + \pi N(d2))/(V/60)$$

The time T (sec) needs to be greater than the time needed for the laser torch 2 to penetrate the piercing hole H into the steel plate W with a plate thickness of t (mm).

In the present embodiment, the offset amount is one half of the radius d2 of the circular trajectory.

Figure 6A:
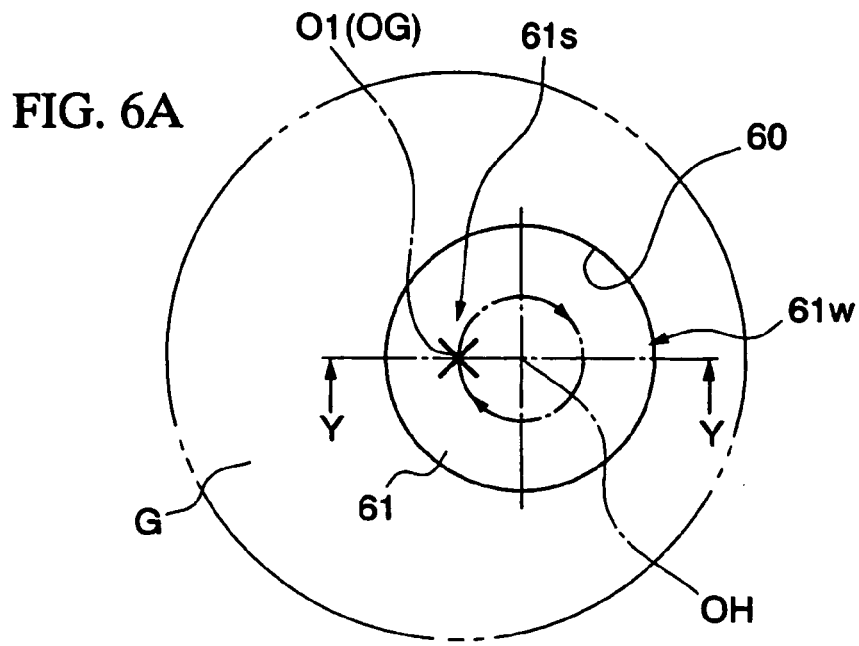
FIG. 6A is a top plan view.
Figure 6B:
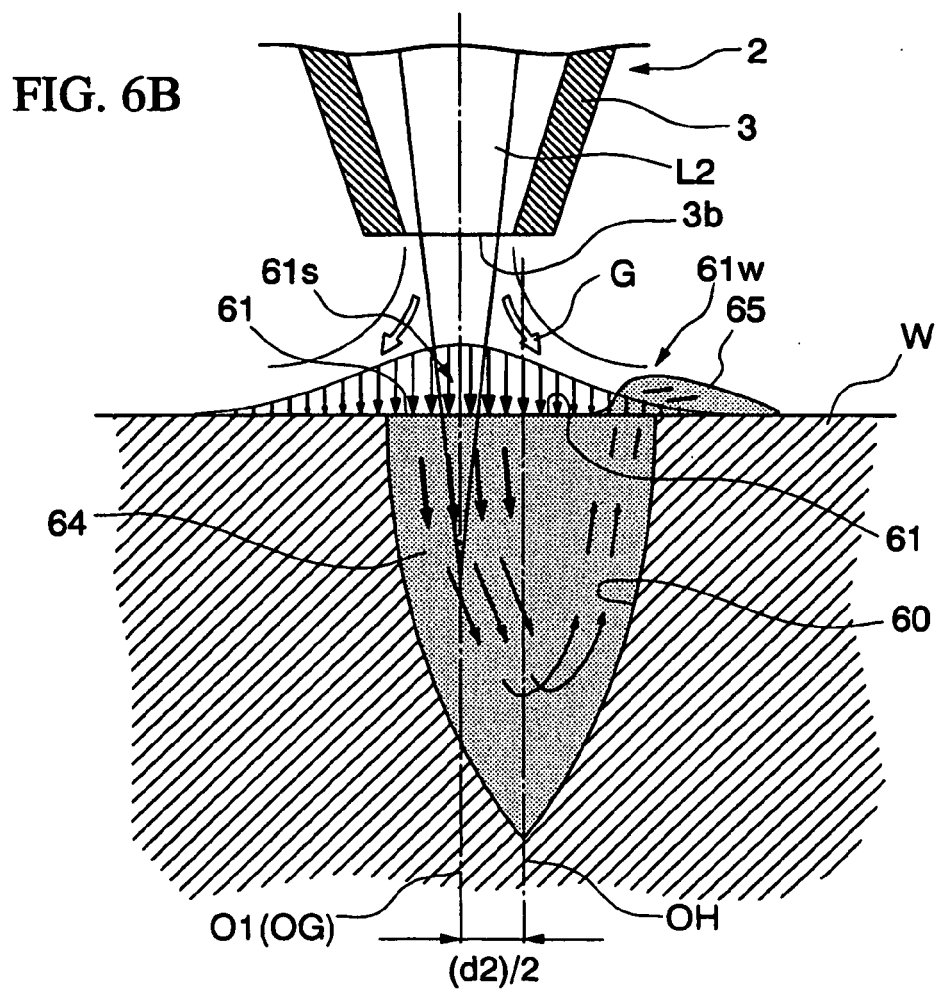
FIG. 6B is a side view.

When the laser torch 2 orbits around the processing start point in a state that the central line O1 of the nozzle 3, i.e., the central axis OG of the pressure distribution of the assist gas G is offset from the processing start point, the central axis OG of the pressure distribution of the assist gas G is offset from the processing start point as the center of the opening 61 of the molten pond 60. As a result, as shown in FIGS. 6A and 6B, the pressure distribution of the assist gas G is eccentric to the processing start point as the center of the molten pond 60 and is thus biased asymmetric to the processing start point. Consequently, the pressure distribution of the assist gas G in the opening 61 of the molten pond 60 is biased, producing a high-pressure area 61s and a low-pressure area 61w.

FIG. 7 shows an exemplary pressure distribution of the assist gas G having a central pressure of about 0.0255 MPa at the center of the pressure distribution. In this pressure distribution, a pressure difference of 0.0015 MPa is produced when the axial line O1 of the laser torch 2 is offset 0.02 mm from the processing start point.

When the pressure distribution of the assist gas G is concentric to the processing start point as the center of the molten pond 60, the pressure of the assist gas G acts like a cover of the molten pond 60 and the molten material 64 is stably maintained within the molten pond 60. However, when the balance of the pressure distribution of the assist gas G is biased to produce the high-press areas 61s and the low-pressure area 61w, the pressure applied to the molten material 64 differs greatly depending on the position in the opening 61 of the molten pond 60, causing the molten material 64 to move from the area 61s toward the area 61w, which is thought to facilitate the discharge of the molten material 64 to the outside. The discharged molten material 64 adheres to the surface of the steel plate W, forming deposits 65 thereon such as dross.

As a result, it is conjectured that during the offset (including the offset during the orbiting movement) from the processing start point as the center of the molten pond 60, the assist gas G prevents the molten material 64 from being stored in the molten pond 60 and suppresses the excessive oxidation and burning of the molten material 64, suppressing increasing of the diameter of the piercing hole H and finally forming a small-diameter piercing hole H.

In addition, because the laser torch 2 orbits around the processing start point, the molten material 64 in the molten pond 60 is scattered and discharged toward the periphery of the molten pond 60. Heat emitted from the discharged molten material 60 does not concentrate on a single point, suppressing a local overheating and an excessive oxidation reaction of the steel plate W at the periphery of the piercing hole H, and suppressing the piercing hole diameter d1 from increasing.

As a result, in the case of continuous irradiation of a laser beam, it is possible to form a piercing hole with a high-precision hole diameter in a simple and secure manner while providing high productivity by the continuous irradiation.

Figure 5B:
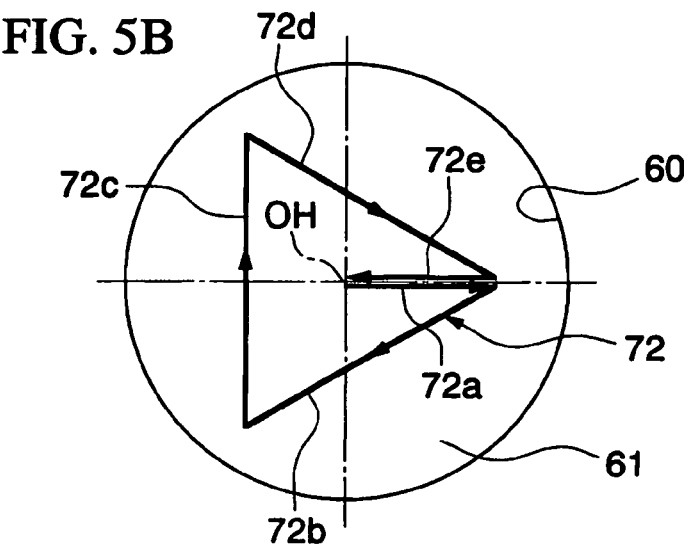
FIG. 5B shows a triangular trajectory.

In the first embodiment, description has been made for the case where the laser torch 2 orbits around the processing start point making the circular trajectory 71. However, as shown in FIG. 5B, the laser torch 2 may orbit around the processing start point along a triangular trajectory 72 in such a manner that the laser torch 2 is first offset from the processing start point along a straight line 72a, and then makes a triangle by traveling along straight lines 72b, 72c, and 72d, and finally returns to the processing start point along a straight line 72e after completing one or several orbiting movements.

Figure 5C:
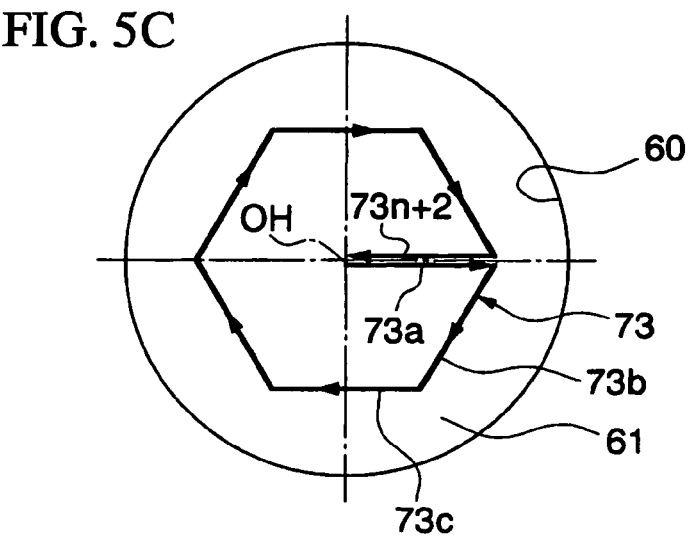
FIG. 5C shows a polygonal trajectory.

Moreover, as shown in FIG. 5C, the laser torch 2 may orbit around the processing start point along a polygonal trajectory 73 in such a manner that the laser torch 2 is first offset from the processing start point along a straight line 73a, and then make an n-sided polygon by traveling along n straight lines 73b, 73c, and so on, and finally return to the processing start point along a straight line 73n+2 after completing one or several orbiting movements.

Figure 8:
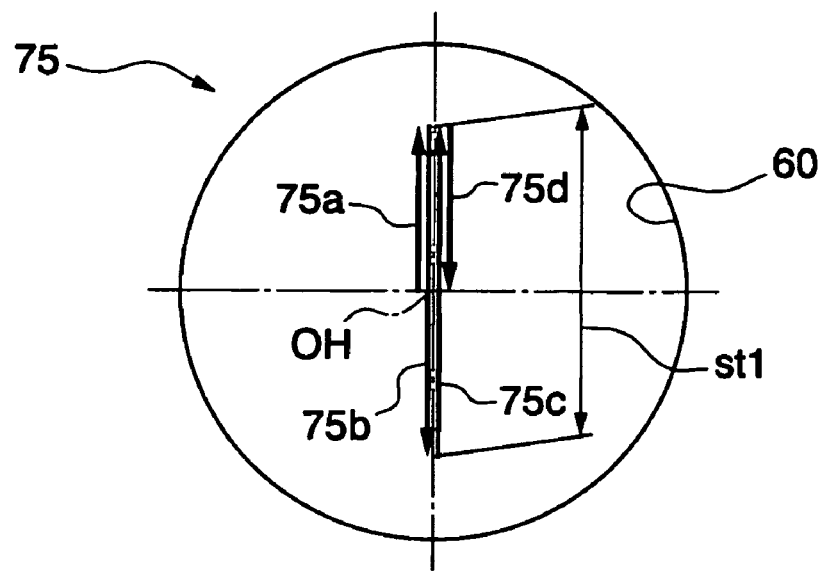
FIG. 8 is a diagram showing the trajectory of the laser torch according to the first embodiment of the present invention, in which the nozzle moves in a reciprocating manner.

As shown in FIG. 8, the laser torch 2 may reciprocate along a reciprocating trajectory 75 in such a manner that the laser torch 2 is offset from the processing start point along a straight line 75a and then make a stroke of st1 while traveling along straight lines 75b, 75c, and 75d in a reciprocating manner or move while drawing a trajectory including such a reciprocating movement.

Figure 9:
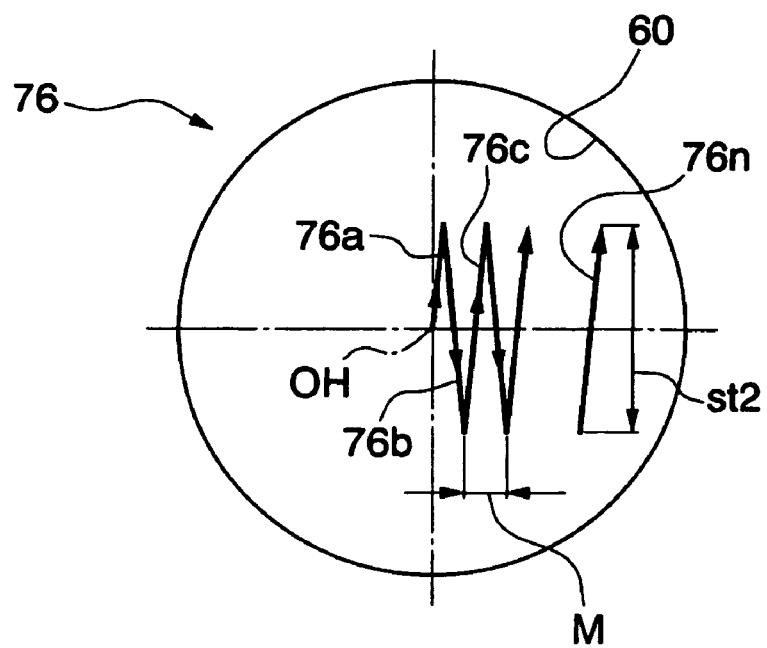
FIG. 9 is a diagram showing the trajectory of the laser torch according to the first embodiment of the present invention, in which the nozzle moves in a zigzag manner.

As shown in FIG. 9, the laser torch 2 may move in a reciprocating manner along a zigzag trajectory 76 in such a manner that the laser torch 2 is offset from the processing start point along a straight line 76a and then makes a stroke of st2 while traveling along straight lines 76b, 76c, . . . , and 76n in such a reciprocating manner that the laser torch 2 is shifted by a distance of M at the end of one reciprocation in a direction perpendicular to the reciprocating movement.

In the zigzag movement, the shifting movement of the laser torch at the end of one reciprocation may be made in a predetermined angle other than 90 degrees with respect to the reciprocating movement or may follow a Z shape.

In the case of moving the laser torch 2 along the reciprocating trajectory 75 and the zigzag trajectory 76, it is not necessary to move the laser torch 2 to the position corresponding to the processing start point.

In the laser piercing method and the processing apparatus 1 of the first embodiment, the laser torch 2 is offset from the processing start point and makes an orbiting movement, for example, along a circular trajectory, causing the molten material 64 in the molten pond 60 to move from the high-pressure area 61s where the pressure of the assist gas G in the opening 61 of the molten pond 64 is high toward the low-pressure area 61w where the pressure of the assist gas G is low. As a result, the molten material 64 in the molten pond 60 is scattered and discharged toward the periphery of the molten pond 60, discharging the molten material 64 from the molten pond 60 in a short time. Consequently, it is possible to suppress oxidation of the molten material 64 and to thus decrease the piercing hole diameter d1.

Oxygen Content Control Section

First, the processing section 12b acquires data regarding the plate thickness t (thickness t of the processing portion) of the steel plate W to be subjected to the piercing hole processing and the piercing hole diameter d1 from the plate thickness input section 31a and the piercing hole size input section 31b.

Then, determination is made as to whether or not to adjust the oxygen content C of the assist gas G injected from the nozzle 3 on the basis of the inputted plate thickness t of the steel plate W and the piercing hole diameter d1. If the adjustment of the oxygen content C is required, the oxygen content C of the assist gas G for the plate thickness t of the steel plate W is determined by the following formulas (1) to (3).

For a plate thickness t in the range of $0 < t < 8$ mm, $$\text{the oxygen content } C \text{ is in the range of } 0 < C < 99.9 \quad (1);$$

For a plate thickness t in the range of $8 \leq t < 13.5$ mm, $$\text{the oxygen content } C \text{ is in the range of } 0 < C \leq -1.65t + 111.2 \quad (2); \text{ and}$$

For a plate thickness t in the range of $13.5 \leq t \leq 26.33$ mm, $$\text{the oxygen content } C \text{ is in the range of } 5.28t - 71.28 \leq C \leq -1.65t + 111.2 \quad (3).$$

In the above formulas, C denotes an oxygen content (volume %), and t denotes a plate thickness (mm) of a steel plate W.

According to the needs, instructions on the injection pressure P of the assist gas G injected from the nozzle 3 may be inputted from the pressure mode input section 31d. In this case, when performing the piercing hole processing on the basis of the formulas (1) to (3), the injection pressure P of the assist gas G suitable for performing the piercing hole processing is as follows:

For a plate thickness t in the range of $0 < t < 13$ mm, $$\text{the injection pressure } P \text{ is in the range of } 0.015 \leq P \leq 0.05 \quad (4); \text{ and}$$

For a plate thickness t in the range of $13 \leq t \leq 26.33$ mm, $$\text{the injection pressure } P \text{ is in the range of } 0.002t - 0.0111 \leq P \leq 0.002t + 0.024 \quad (5).$$

In the above formulas, P denotes an injection pressure (MPa) of an assist gas G, and t denotes a plate thickness (mm) of a steel plate W.

The optimal injection pressure P of the assist gas is determined by the following formulas:

For a plate thickness t in the range of $0 < t < 13$ mm, $$\text{the injection pressure P is set to } P = 0.03 \quad (6); \text{ and}$$

For a plate thickness t in the range of $13 \leq t \leq 26.33$ mm, $$\text{the injection pressure } P \text{ is set to } P = 0.002t + 0.004 \quad (7).$$

In the above formulas, P denotes an injection pressure (MPa) of an assist gas G, and t denotes a plate thickness (mm) of a steel plate W.

By using the optimal injection pressure P, it is possible to substantially completely discharge the molten material 64 from the molten pond 60 and to thus decrease the piercing hole diameter d1.

Next, the processing section 12b acquires data regarding the opening ratios of the mass flow controllers 27a and 27b corresponding to the oxygen content of the assist gas G calculated by the above formulas and the control data of the pressure adjustment valve 25 for obtaining the calculated injection pressure P of the assist gas G from the data table 13 via the signal cable 14, and transmits the acquired data to the mass flow controllers 27a and 27b and the pressure adjustment valve 25 via the signal cables 26a, 26b, and 28, respectively.

The mass flow controllers 27a and 27b open and close the flow paths in accordance with the opening ratios transmitted from the processing section 12b so that oxygen and nitrogen are supplied from the oxygen supply source 41 and the nitrogen supply source 43 to the mixer 24 by a predetermined amount required for producing the assist gas G having a desired oxygen content.

The oxygen and nitrogen of the predetermined amount supplied to the mixer 24 are mixed with each other by the mixer 24, producing an assist gas G with a predetermined oxygen content. The assist gas G is then supplied to the nozzle 3 and is injected from the injection port 3b of the nozzle 3 toward the steel plate W. At the same time, the laser beam L2 is irradiated onto the steel plate W and the piercing processing is performed thereon.

In this case, by adjusting the oxygen content of the assist gas G so as not to cause excessive oxidation and burning even in the case of using continuous irradiation of the laser beam L rather than using the pulsed irradiation, it is possible to form the piercing hole H with high efficiency.

In this case, the pressure adjustment valve 25 is controlled by the control data transmitted from the processing section 12b, and the assist gas G supplied to the nozzle 3 can have a desired injection pressure P.

In the laser piercing method and the processing apparatus 1 of the first embodiment, the oxygen content C of the assist gas G injected from the nozzle 3 is determined on the basis of the plate thickness t of the steel plate W, and the piercing hole processing is performed using the oxygen content C. Therefore, it is possible to suppress excessive oxidation and burning of the steel plate and to thus decrease the amount of dross. Accordingly, it is possible to form the piercing hole H to the smaller diameter under various plate thicknesses t of the steel plates W in a simple and secure manner without decreasing the yield of materials and the quality.

By adjusting the oxygen content of the assist gas G, even in the case of continuous irradiation of a laser beam, it is possible to form a small-diameter piercing hole in a simple and secure manner while suppressing excessive oxidation and burning and providing high productivity by the continuous irradiation.

Dross Removal Control Section

First, determination is made as to whether or not to perform the dross removal operation after the piercing hole processing is performed. If required, the dross removal operation is selected when the piercing hole processing is completed, and an instruction signal is inputted to the dross removal mode input section 31e.

The signal inputted from the dross removal mode input section 31e is transmitted to the processing section 12c via the data cable 33e.

The processing section 12c transmits the data regarding the plate thickness t of the steel plate W and the piercing hole diameter d1 supplied from the piercing hole size input section 31b to the data table 13c. Then, the processing section 12c acquires data regarding the hole diameter of the piercing hole H to be processed and the position of the nozzle 3 suitable for the removal of dross in the piercing hole H from the data table 13c.

Examples of the data regarding the position and operations that the processing section 12c acquires from the data table 13c includes the distance from the axial line OH of the piercing hole H, the height from the surface of the steel plate W, the orbit speed of the nozzle 3, the number of orbit cycles, the orbiting trajectory (including information regarding the distance from the axial line OH or from the peripheral border of the piercing hole H), and the like.

The processing section 12c calculates time and position information for moving the driving member 80 on the basis of the data acquired from the data table 13c. The calculation results are transmitted to the X driver 16a, the Y driver 16b, and the Z driver 16c via the signal cables 15a, 15b, and 15c, respectively, driving the drivers.

The X driver 16a, the Y driver 16b, and the Z driver 16c drive the driving member 80 to move the laser torch 2 (the nozzle 3).

The sequence of operations is as follows.

The laser torch 2 is placed at a predetermined position, for example, at the processing start point.

In an automatic mode of operation, the dross removal operation is automatically activated subsequent to the completion of the piercing hole processing. Alternatively, the dross removal operation may be manually activated by activating an activation switch.

The laser torch 2 is elevated by the Z driver 16c to a predetermined height.

Next, a laser beam L2 is irradiated from the laser torch 2, and at the same time, the assist gas G is injected from the nozzle 3.

In this case, the elevation of the laser torch 2, the irradiation of the laser beam L2, and the injection of the assist gas G may be performed at the same time.

Next, the driving member 80 is driven by the X driver 16a and the Y driver 16b to move the laser torch 2 so that the axial line O1 of the laser torch 2 is moved from the peripheral border of the piercing hole H by a predetermined distance.

Thereafter, the driving member 80 is driven by the X driver 16a and the Y driver 16b, causing the laser torch 2 to make an orbiting movement above the surface of the steel plate W at the periphery of the piercing hole H. In the meantime, the deposited dross is heated and melted by the laser beam L2 and is oxidized and burnt by the assist gas G, which is then removed by the assist gas G.

After a predetermined cycle of the orbiting movement around the processing start point, the irradiation of the laser beam L2 and the injection of the assist gas G are completed. Then, the laser torch returns to the processing start point, completing the dross removal operation.

In the first embodiment, the data regarding the flow rate and pressure of the assist gas G are stored in the data table. However, the data may be calculated by the processing section 12c.

Preferably, the position of the axial line O1 of the laser torch 2 with respect to the piercing hole H is set so as to be located above the surface of the steel plate W at a position in the range of 0 (corresponding to the peripheral border of the piercing hole H) and 3.0 mm away from the peripheral border of the piercing hole H in the radial direction.

The laser torch 3 was tested using the steel plate W having a plate thickness t of 22 mm and a continuous irradiation of a laser with an output of 6 kW. The test was performed under the following conditions:

the distance between the nozzle 3 and the surface of the steel plate was 50 mm;

the injection pressure P of the assist gas was 0.1 MPa; and the circular trajectory of the axial line O1 of the laser torch 2 was set such that the circular trajectory has a radius of 4.25 mm with a center at the axial line OH of a piercing hole having a diameter d1 of 4.5 mm. That is, the laser torch 2 orbited around the piercing hole in a state that the axial line O1 was offset from the axial line OH of the piercing hole by a distance of 2 mm away from the peripheral border of the piercing hole in the radial direction. A good test result was obtained.

In the laser piercing method and the processing apparatus 1 of the first embodiment, after penetration of the piercing hole H, the laser torch 2 (the nozzle 3) is moved upward from the surface of the workpiece at the periphery of the piercing hole 3, and a laser beam is irradiated onto the surface of the workpiece to melt the deposited dross again so that the dross can be easily peeled off. In addition, the laser torch 2 orbits around the piercing hole H with the assist gas G injected from the nozzle 3 toward the piercing hole H when the dross is easily burnable. Therefore, it is possible to remove the dross formed on the surface of the workpiece in the vicinity of the opening of the piercing hole in an efficient manner. As a result, it is possible to provide a high-quality piercing hole H.

The nozzle 3 orbits around the piercing hole H and the assist gas G is injected to the dross from a close distance. Therefore, it is possible to remove the dross in a secure manner even with a small flow volume. As a result, it is possible to greatly decrease the processing time and the processing cost.

The present invention is not limited to the first embodiment, but various modifications are possible without departing from the spirit of the present invention.

In the above embodiment, description has been made for the case of continuously irradiating the laser beam L2 onto the steel plate W. However, the laser beam L2 may be irradiated in a pulsed manner. Pulsed irradiation having a duty of 90 percent or more can provide substantially the same effect as the continuous irradiation.

In the first embodiment, description has been made for the case where the movement control of the laser torch 2 and the adjustment of the oxygen content of the assist gas G are performed in a combined manner. However, it is arbitrary whether or not to combine the movement control of the laser torch 2 with the adjustment of the oxygen content of the assist gas G.

In the first embodiment, description has been made only for the case where the laser torch 2 orbits around the center of the piercing hole in a circular shape. However, the shape of the trajectory of the distal end of the laser torch 2 is not limited to a circle but the shape may be a polygon such as a triangle or a rectangle. Additionally, the movement of the laser torch may be a reciprocating movement or a zigzag movement.

In the first embodiment, description has been made to the case where the workpiece W is a steel plate. However, the workpiece W applicable to the method and the processing apparatus 1 of the present invention is not limited to a plate material having a uniform thickness t, but the thickness t of the processing portion may differ from that of other portions. The plate material may be formed of other metals such as stainless steel, aluminum, copper or titanium, or an ally thereof.

Incidentally, the assist gas G may contain inert gases such as argon or helium.

As formulas for specifying the oxygen content C of the assist gas G, formulas (1) to (3) were used. However, the processing apparatus 1 may perform the piercing hole processing by using a control pattern that is based on other formulas different from the formulas (1) to (3). If the processing apparatus is provided with the above-described control section, the oxygen content and the injection pressure P may be controlled by an opening-ratio adjusting device that uses scale marks, a toothed wheel or a link mechanism of the mass flow controllers 27a and 27b or the like.

In the first embodiment, description has been made for the case where the processing section 12 calculates the trajectory of the laser torch 2 and the number of orbit cycles corresponding to the plate thickness t of the workpiece W on the basis of the data such as the plate thickness t inputted to the processing data input section 30, and the movement of the laser torch 2 is controlled on the basis of the control data acquired from the data table 13. However, the processing section 12a may calculate the control data on the basis of the information on the inputted plate thickness t or the like, and the movement of the laser torch 2 may be controlled on the basis of the calculation result.

In the first embodiment, description has been made for the case where the processing section 12 calculates the oxygen content of the assist gas G, and the mass flow controllers 27a and 27b are controlled on the basis of the control data acquired from the data table 13b. However, the control data may be directly calculated on the basis of the information on the inputted plate thickness t or the like, and the oxygen content C and the injection pressure P may be adjusted on the basis of the calculation result.

Next, a verification test conducted to verify the effect of the piercing hole processing according to the first embodiment of the present invention will be described.

Figure 10:
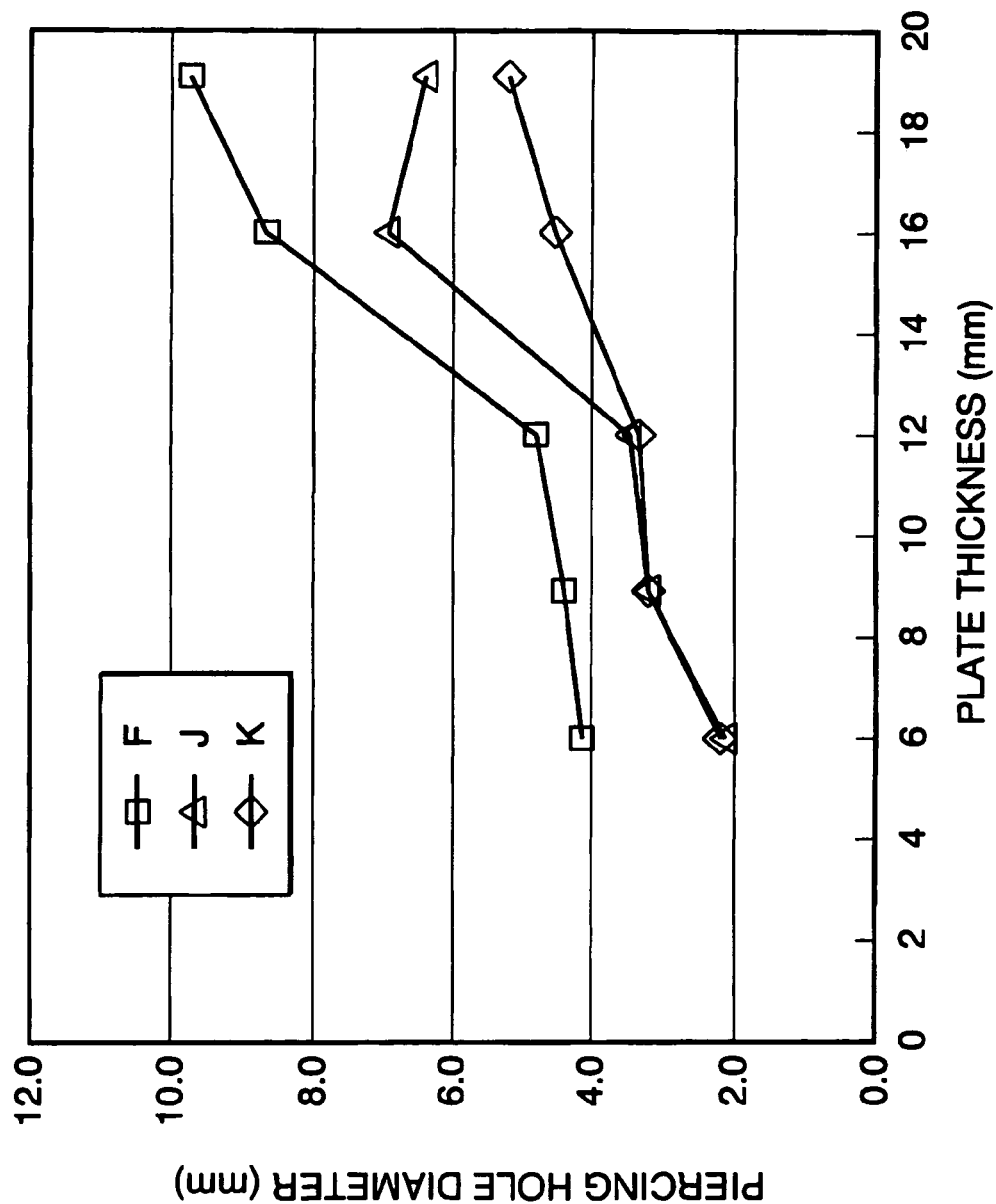
FIG. 10 is a diagram showing the effect of the piercing hole processing according to the first embodiment of the present invention.

FIG. 10 shows the verification results obtained when the laser torch 2 orbits around the processing start point along the circular trajectory 71. Specifically, FIG. 10 shows the relationship between the plate thickness t (mm) of the steel plate W and the piercing hole diameter d1 (mm) when the piercing hole was processed by irradiating a laser beam onto steel plates with different thicknesses using a laser processing apparatus while injecting an assist gas from the nozzle at the same time as the irradiation. The plate thickness t of the steel plate W used in the test was 6 mm, 6 mm, 9 mm, 12 mm, 16 mm, 19 mm. In the drawing, reference symbols F, J, and K correspond to Comparative Example 1, Example 1, and Example 2, respectively.

The processing conditions of the laser processing apparatus were as follows:

(1) Continuous irradiation of a laser with an output of 2.5 kW; and (2) Distance between the steel plate W and the opening of the nozzle: 6 mm The above processing conditions were commonly used in the Comparative Example 1, Example 1, and Example 2.

In Example 1, the piercing hole was processed under conditions in which after starting the piercing hole processing of the steel plate, the axial line O1 of the laser torch 2 was offset from the processing start point, and the laser torch 2 was allowed to orbit around the processing start point along a circular trajectory for a predetermined number N of orbit cycles and then returned to the processing start point.

In Example 2, in addition to the processing conditions used in Example 1, the piercing hole was processed under conditions in which the oxygen content C of the assist gas G was adjusted to 52.6 (volume %).

In Comparative Example 1, the piercing hole was processed under conditions in which the axial line O1 of the laser torch 2 still remained aligned on the processing start point even after starting the processing of the piercing hole H.

The processing conditions for the plate thickness t of the steel plate are summarized in Table 1, in which the torch speed, the number of orbit cycles, the diameter d2 of circular trajectory are processing conditions for Examples 1 and 2.

Processing Conditions

TABLE 1

| Plate Thickness t of Steel Plate | Torch Speed | Number of orbit cycles | Diameter of Circular Trajectory | Assist Gas Pressure |
|---|---|---|---|---|
| 6 mm | 1500 mm/min | 1 | 0.5 mm | 0.04 MPa |
| 9 mm | 500 mm/min | 2 | 2.0 mm | 0.04 MPa |
| 12 mm | 500 mm/min | 5 | 4.0 mm | 0.04 MPa |
| 16 mm | 1500 mm/min | 5 | 4.0 mm | 0.23 MPa |
| 19 mm | 1500 mm/min | 5 | 4.0 mm | 0.234 MPa |

Verification Results

The piercing hole diameters d1 obtained from Example 1, Example 2, and Comparative Example 1 under the above processing conditions are summarized in Table 2.

TABLE 2

| Plate Thickness t of Steel Plate | Example 1 | Example 2 | Comparative Example 1 |
|---|---|---|---|
| 6 mm | 2.2 mm | 2.2 mm | 4.1 mm |
| 9 mm | 3.3 mm | 3.2 mm | 4.4 mm |
| 12 mm | 3.4 mm | 3.3 mm | 4.8 mm |
| 16 mm | 7.1 mm | 4.5 mm | 8.7 mm |
| 19 mm | 6.5 mm | 5.2 mm | 9.7 mm |

As can be seen from the above results, it can be concluded that Examples 1 and 2 are advantageous over Comparative Example 1 for all of the steel plates having plate thicknesses of 6 mm, 9 mm, 12 mm, 16 mm, and 19 mm.

When the two Examples 1 and 2 were compared with each other, the piercing hole diameter obtained from Example 2 was not changed much when the plate thickness t was in the range of 6 mm and 12 mm but showed a great change (maximum reduction ratio of about 37 percent) when the plate thickness t was in the range of 16 mm and 19 mm. Thus, it can be concluded that adjustment of the oxygen content of the assist gas provided other advantages.

Next, the verification results of Example 3, Example 4, and Comparative Example 2 will be described. In this verification test, a steel plate having a plate thickness of 22 mm was used.

The processing conditions of the laser processing apparatus were as follows:

(1) Continuous irradiation of a laser with an output of 6.0 kW; and (2) Distance between the steel plate W and the opening of the nozzle: 4 mm In Examples 3 and 4, the piercing holes were processed under conditions in which after starting the piercing hole processing of the steel plate, the axial line O1 of the laser torch 2 was offset from the processing start point, and the laser torch 2 was allowed to orbit around the processing start point along a circular trajectory having a diameter d2 of 0.5 mm at a torch speed of 150 mm/min for two orbit cycles and are then returned to the processing start point. In Example 4, in addition to the processing conditions used in Example 3, the piercing hole was processed under conditions in which the oxygen content C of the assist gas G was adjusted to 52.6 (volume %).

As for the processing conditions for the injection pressure of the assist gas, an injection pressure of 0.04 MPa was commonly used in Examples 3 and 4 and Comparative Example 3.

Verification Results

The piercing hole diameters d1 obtained from Example 3, Example 4, and Comparative Example 2 under the above processing conditions are summarized in Table 3.

TABLE 3

| Plate Thickness t of Steel Plate | Example 3 | Example 4 | Comparative Example 2 |
|---|---|---|---|
| 22 mm | 6.2 mm | 4.5 mm | 7.6 mm |

As can be seen from the above results, it can be concluded that Examples 3 and 4 are advantageous over Comparative Example 2.

When the two Examples 3 and 4 were compared with each other, the piercing hole diameter obtained from Example 4 showed a great change (maximum reduction ratio of about 28 percent). Thus, it can be concluded that adjustment of the oxygen content of the assist gas provided other advantages.

Next, the verification results obtained when the piercing hole was processed on a steel plate having a plate thickness of 22 mm while allowing the laser torch 2 to move along the reciprocating trajectory 75 and the zigzag trajectory 76 according to the first embodiment will be described. Example 5 corresponds to the case where the laser torch 2 moves along a movement trajectory 75. Example 6 corresponds to the case where the laser torch 2 moves along a movement trajectory 76.

The processing conditions of the laser processing apparatus in Examples 5 and 6 were as follows:

(1) Continuous irradiation of a laser with an output of 6.0 kW;

(2) Distance between the steel plate W and the opening of the nozzle was 6 mm;

(3) Torch speed of 600 mm/min and assist gas injection pressure P of 0.35 MPa;

(3) In Example 5, the reciprocating trajectory of the laser torch 2 had a stroke st1 of 0.5 mm and the number of reciprocations was 5;

(4) In Example 6, the zigzag trajectory of the laser torch 2 had a stroke st2 of 0.5 mm in the reciprocating direction, the number of reciprocations was 5, and a shift amount M at the end of one reciprocation in a direction perpendicular to the reciprocating movement was 0.2 mm.

Comparative Example 2 was performed under the same processing conditions as described in connection with Examples 3 and 4.

Verification Results

The piercing hole diameter d1 obtained from Example 5 under the above processing conditions is summarized in Table 4.

TABLE 4

| Plate Thickness t of Steel Plate | Example 5 | Comparative Example 2 |
|---|---|---|
| 22 mm | 3.5 mm | 7.6 mm |

The piercing hole diameter d1 obtained from Example 6 under the above processing conditions is summarized in Table 5.

TABLE 5

| Plate Thickness t of Steel Plate | Example 6 | Comparative Example 2 |
|---|---|---|
| 22 mm | 3.5 mm | 7.6 mm |

As can be seen from the above results, it can be concluded that Examples 5 and 6 are advantageous over Comparative Example 2.

Hereinafter, a second embodiment of the present invention will be described with reference to the accompanying drawings.

Figure 11:
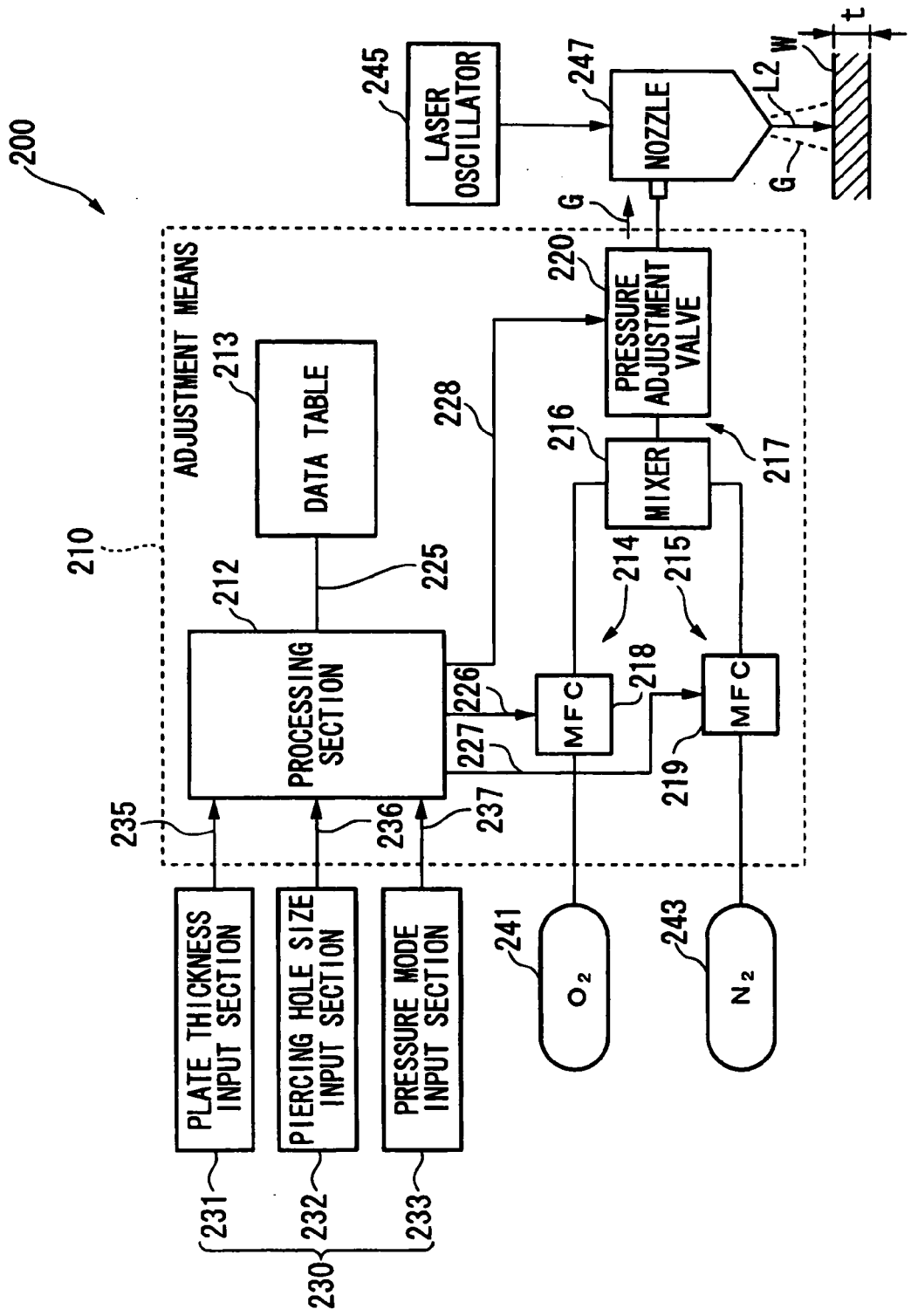
FIG. 11 is a diagram showing a schematic structure of a processing apparatus according to a second embodiment of the present invention.

FIG. 11 is a schematic diagram of a processing apparatus according to the present invention. In FIG. 11, reference numeral 200 denotes a processing apparatus, reference numeral 210 denotes an adjustment section (adjustment means), and reference numeral 211 denotes an oxygen content adjustment section (oxygen content adjustment means).

The processing apparatus 200 includes an adjustment section 210, a processing data input section 230, an oxygen supply source 241, a nitrogen supply source 243, a laser oscillator 245, and a nozzle 247. The adjustment section 210 is configured to mix oxygen from the oxygen supply source 241 with nitrogen from the nitrogen supply source 243 while adjusting their amounts on the basis of the processing data inputted from the processing data input section 230, to produce an assist gas G having an oxygen content suitable for providing a desired piercing hole diameter, and to supply the produced assist gas to the nozzle 247.

The adjustment section 210 includes an oxygen content adjustment section 211, a processing section 212, a data table 213, an oxygen flow rate adjustment circuit 214, a nitrogen flow rate adjustment circuit 215, a mixer 216, and a pressure adjustment valve 220. The processing section 212 is connected to the data table 213, the oxygen flow rate adjustment circuit 214, the nitrogen flow rate adjustment circuit 215, and the pressure adjustment valve 220 via signal cables 225, 226, 227, and 228, respectively.

The data table 213 stores control data for providing the assist gas G with a predetermined oxygen content and a predetermined injection pressure to the oxygen flow rate adjustment circuit 214, the nitrogen flow rate adjustment circuit 215, and the pressure adjustment valve 220.

The oxygen flow rate adjustment circuit 214 and the nitrogen flow rate adjustment circuit 215 are connected to the oxygen supply source 241 and the nitrogen supply source 243, respectively. The oxygen supply source 241 and the nitrogen supply source 243 store liquid oxygen and liquid nitrogen, respectively. The liquid oxygen and the liquid nitrogen are vaporized and are then supplied to the oxygen flow rate adjustment circuit 214 and the nitrogen flow rate adjustment circuit 215.

The oxygen flow rate adjustment circuit 214 includes a mass flow controller 218 and a pipeline and is connected between the oxygen supply source 241 and the mixer 216. The flow rate of the oxygen supplied from the oxygen supply source 241 through the pipeline is adjusted by the mass flow controller 218.

The nitrogen flow rate adjustment circuit 215 includes a mass flow controller 219 and a pipeline and is connected between the nitrogen supply source 243 and the mixer 216. The flow rate of the nitrogen supplied from the nitrogen supply source 243 through the pipeline is adjusted by the mass flow controller 219.

The oxygen and nitrogen of which the flow rates are adjusted by the mass flow controllers 218 and 219 are supplied to and mixed by the mixer 216, producing an assist gas G with a predetermined oxygen content. The produced assist gas G is supplied to the nozzle 247 through a supply pipeline 217. To provide the assist gas G having a predetermined injection pressure P to the nozzle 247, the assist gas G is controlled by the pressure adjustment valve 220 on the basis of the control data supplied from the processing section 212 so as to provide a predetermined pressure corresponding to the injection pressure P. In the second embodiment, the nozzle 247 is provided with a storage section for storing the assist gas G having a sufficiently large volume relative to the injection port. The injection pressure P of the assist gas G in the injection port is maintained at substantially the same as the pressure of the assist gas G supplied from the pressure adjustment valve 220.

In the second embodiment, the control data for controlling the oxygen flow rate adjustment circuit 214 and the nitrogen flow rate adjustment circuit 215 includes data regarding opening ratios of the mass flow controller 217 and 219.

The processing data input section 230 includes a plate thickness input section (thickness input section) 231, a piercing hole size input section 232, and a pressure mode input section 233. These sections are connected to the processing section 212 via data cables 235, 236, and 237, respectively.

The plate thickness input section 231 is used to input data regarding the plate thickness (thickness of a processing portion) t of the workpiece W such as a steel plate (metallic workpiece) W.

The piercing hole size input section 232 is used to input data, among processing data for piercing processing, regarding the piercing hole size (for example, data regarding the size of the piercing hole diameter with respect to the plate thickness t; a minimum hole size at a plate thickness t of ⅓ or ⅕ of the plate thickness t) with respect to the plate thickness t of the steel plate W.

The pressure mode input section 233 is used to input instruction data for instructing the processing section 12 to increase (or decrease) the supply pressure of the assist gas G supplied to the nozzle 247 to inject the assist gas G at a high (or low) injection pressure from the nozzle 247 in order to discharge the molten material in the piercing hole produced during the piercing processing to the outside of the piercing hole so that no molten material remains in the piercing hole. The pressure mode input section 233 transmits the instruction data to the processing unit 212.

The processing section 212 is configured to calculate the oxygen content C of the assist gas G suitable for providing a desired piercing hole diameter to the steel plate W with the plate thickness of t on the basis of the data regarding the plate thickness t, the data regarding the piercing hole size inputted and supplied from the processing data input section 30, and the instruction data regarding the injection pressure P of the assist gas G, and to acquire the control data of the oxygen flow rate adjustment circuit 214 and the nitrogen flow rate adjustment circuit 215 required for providing the assist gas G with a predetermined oxygen content C from the data cable 213 via the signal cable 225.

When the pressure mode input section 34 receives instructions on adjusting the pressure of the assist gas, in order to inject the assist gas G having an injection pressure G corresponding to the thickness t of the processing portion of the workpiece W inputted from the plate thickness input section 231 in response to the signal from the pressure mode input section 34, the processing section 212 acquires, from the data table 213, the control data for supplying the assist gas G having a pressure corresponding to the injection pressure P to the nozzle 247 through the pressure adjustment valve 220, and supplies the acquired control data to the pressure adjustment valve 220 via the signal cable 228.

Next, operations of the processing apparatus 200 according to the second embodiment will be described.

First, data regarding a desired piercing hole size to be processed on the workpiece W are inputted to the plate thickness input section 231, the piercing hole size input section 232, and the pressure mode input section 233 of the processing data input section 230. Examples of the data regarding the desired piercing hole size include numeric data regarding a plate thickness t and a piercing hole size at a plate thickness t of ⅓ or ⅕ of the plate thickness t, and according to the needs, instructions on the injection pressure P. These data are transmitted to the processing section 212 via data cables 235, 236, and 237, respectively.

The processing section 212 calculates the oxygen content C and the injection pressure P of the assist gas G suitable for the piercing processing on the basis of the transmitted piercing data and predefined formulas.

The specific value of the plate thickness t and the formulas applied to the piercing hole size information are as follows.

For example, when the piercing hole diameter is not more than ⅓ of the plate thickness, the oxygen content C is determined by the following formulas:

For a plate thickness t in the range of 0<t<8 mm, $$\text{the oxygen content } C \text{ is in the range of } 0<C<99.9 \quad (1\text{-}1);$$

For a plate thickness t in the range of 8≦t<13.5 mm, $$\text{the oxygen content } C \text{ is in the range of } 0<C\leq-1.65t+111.2 \quad (1\text{-}2); \text{ and}$$

For a plate thickness t in the range of 13.5≦t≦26.33 mm, $$\text{the oxygen content } C \text{ is in the range of } 5.28t-71.28 \leq C \leq -1.65t+111.2 \quad (1\text{-}3)$$

In the above formulas, C denotes an oxygen content (volume %), and t denotes the thickness (mm) of a workpiece.

When the piercing hole diameter is not more than ⅕ of the plate thickness, the oxygen content C is determined by the following formulas:

For a plate thickness t in the range of 0<t<12 mm, $$\text{the oxygen content } C \text{ is in the range of } 0<C<85 \quad (2\text{-}1); \text{ and}$$

For a plate thickness t in the range of 12≦t≦22.76 mm, $$\text{the oxygen content } C \text{ is in the range of } 5.71t-68.52 \leq C \leq -2.19t+111.28 \quad (2\text{-}2)$$

The oxygen content C suitable for minimizing the piercing hole diameter for each plate thickness t is determined by the following formulas:

For a plate thickness t in the range of 0<t<12.0 mm, $$\text{the oxygen content } C \text{ is set to } C=0 \quad (3\text{-}1); \text{ and}$$

For a plate thickness t in the range of 12.0≦t≦26.33 mm, $$\text{the oxygen content } C \text{ is set to } C=-0.255t2+14.5t-137.2 \quad (3\text{-}2).$$

Considering the influence of a performance difference of the laser oscillator, an individual difference of the workpiece due to material, and temporal changes such as dust adhering on the laser oscillator, when the oxygen content of the assist gas G is adjusted to fall within a ±10 percent range of the above-described formulas, it is possible to provide a piercing hole having a minimum hole diameter. In this case, the oxygen content C can be determined by the following formulas:

For a plate thickness t in the range of 0<t<12.1 mm, $$\text{the oxygen content } C \text{ is in the range of } 0<C<10 \quad (3\text{-}3); \text{ and}$$

For a plate thickness t in the range of 12.1≦t<9.18 mm, $$\text{the oxygen content } C \text{ is in the range of } 0<C\leq 4.9t-30 \quad (3\text{-}4); \text{ and}$$

For a plate thickness t in the range of 9.18≦t≦26.33 mm, $$\text{the oxygen content } C \text{ is in the range of } 4.9t-45 \leq C \leq 4.9t-30 \quad (3\text{-}5).$$

For the oxygen content C defined by the formulas (1-1) to (1-3), (2-1), (2-2), (3-1), and (3-2), the injection pressure P of the assist gas for providing a piercing hole having a minimum diameter corresponding to ⅓ or ⅕ of the plate thickness t is determined by the following formulas:

For a plate thickness in the range of 0<t<13 mm, $$\text{the injection pressure } P \text{ is in the range of } 0.015 \leq P \leq 0.05 \quad (4\text{-}1); \text{ and}$$

For a plate thickness in the range of 13≦t≦26.33 mm, $$\text{the injection pressure } P \text{ is in the range of } 0.002t-0.011 \leq P \leq 0.002t+0.024 \quad (4\text{-}2).$$

In the above formulas, P denotes an injection pressure (MPa) of an assist gas, and t denotes a thickness (mm) of a workpiece.

The optimal injection pressure P of the assist gas is determined by the following formulas:

For a plate thickness in the range of 0<t<13 mm, $$\text{the injection pressure } P \text{ is set } P=0.03 \quad (4\text{-}3); \text{ and}$$

For a plate thickness in the range of 13≦t≦26.33 mm, $$\text{the injection pressure } P \text{ is set to } P=0.002t+0.004 \quad (4\text{-}4).$$

In the above formulas, P denotes an injection pressure (MPa) of an assist gas, and t denotes a thickness (mm) of a workpiece.

By using the optimal injection pressure P, it is possible to substantially completely discharge the molten material from the piercing hole and to thus provide a piercing hole having a desired diameter.

Next, the processing section 212 acquires data regarding the opening ratios of the mass flow controllers 218 and 219 corresponding to the oxygen content of the assist gas G calculated by the above formulas and the control data of the pressure adjustment valve 220 for obtaining the calculated injection pressure P of the assist gas G from the data table 213 via the signal cable 225, and transmits the acquired data to the mass flow controllers 218 and 219 and the pressure adjustment valve 220 via the signal cables 226, 227, and 228, respectively.

The mass flow controllers 218 and 219 open and close the flow paths in accordance with the opening ratios transmitted from the processing section 212 so that oxygen and nitrogen are supplied from the oxygen supply source 241 and the nitrogen supply source 243 to the mixer 216 by a predetermined amount required for producing the assist gas G having a desired oxygen content.

The oxygen and nitrogen of the predetermined amount supplied to the mixer 216 are mixed with each other by the mixer 216, producing an assist gas G with a predetermined oxygen content. The assist gas G is then supplied to the nozzle 247 and is injected from the distal opening of the nozzle 247 toward the workpiece W. At the same time, the laser oscillator 245 is operated to irradiate the laser beam L2 having passed through the nozzle 247 onto the steel plate W and the piercing processing is performed thereon.

In this case, by adjusting the oxygen content of the assist gas G so as not to cause excessive oxidation and burning even in the case of using continuous irradiation of the laser beam L rather than using the pulsed irradiation, it is possible to form the piercing hole with high efficiency.

In this case, the pressure adjustment valve 220 is controlled by the control data transmitted from the processing section 212, and the assist gas G supplied to the nozzle 247 can have a desired injection pressure P.

In the processing apparatus 200, the oxygen content of the assist gas G injected from the nozzle 247 is adjusted on the basis of the plate thickness t of the steel plate W so as not to cause excessive oxidation and burning. Therefore, even in the case of using continuous irradiation of the laser beam L2, it is possible to form a small-diameter piercing hole in a simple and secure manner. For example, the obtained piercing hole diameter is about ⅓ of the plate thickness t, which is about 20 percent smaller than the conventional diameter; or is about ⅕ of the plate thickness t, which is about 50 percent smaller than the conventional diameter.

Because the piercing hole diameter is small, it is possible to suppress the piercing hole from having a cone shape as the size of the piercing hole diameter increases. As a result, the amount of the dross produced decreases, decreasing the area having adhered dross on the surface of the steel plate W at the periphery of the piercing hole. In the case of adjusting the height of the nozzle 237 on the basis of electrostatic capacitance, it is possible to prevent the dross adhering onto the uneven surface of the steel plate W from causing an unstable height adjustment of the nozzle 247 and from interfering with the flow of the assist gas G and to thus prevent cutting errors.

Because the amount of the dross produced decreases, the overheated and melted portion on the steel plate W at the periphery of the piercing hole is reduced. Accordingly, it is possible to prevent self-burning or cutting errors due to heat generated during a piercing processing.

As a result, it is possible to obviate the concern of cutting errors due to the adhering dross or the concern of a fire due to the dross. Conventionally, it was only possible to obtain a plate thickness of 12 mm when the automatic operation of the piercing operation using continuous irradiation was not monitored. In the present invention, it was possible to obtain a plate thickness of about 16 mm when the piercing hole diameter was ⅓ of the plate thickness, while a plate thickness of about 22 mm was obtained when the piercing hole diameter was ⅕ of the plate thickness.

Generally, in a small-diameter cutting process using continuous irradiation, the cutable diameter is empirically known to be not less than about 1.5 times the plate thickness. By decreasing the piercing hole diameter to ⅓ of the plate thickness, it was possible to cut a small hole having a diameter about 1.3 times greater than the plate thickness using continuous laser irradiation. When the piercing hole diameter is decreased to ⅕ of the plate thickness, it was possible to cut a small hole having a diameter about 1.0 times greater than the plate thickness. Therefore, it is possible to greatly decrease the processing time and the processing cost when cutting a small hole with a diameter in the range of 1.0 and 1.5 times the plate thickness.

Because the oxygen content of the assist gas G is automatically adjusted, it is not necessary to rely on a skilled technician. Besides, it is possible to precisely adjust the oxygen content in a short time.

When the laser beam L2 is continuously irradiated onto the steel plate W, the oxygen content of the assist gas G is adjusted on the basis of the requirements defined by the formulas (1-1), (1-2), (1-3), (2-1), (2-2), (3-1), (3-1), (3-3), (3-4), and (3-5) so as to correspond to desired hole diameter specifications such as the minimum hole diameter at a given plate thickness t of the steel plate, for example ⅓ or ⅕ of the plate thickness t, and the piercing processing is performed with the supply of the assist gas G having the adjusted oxygen content. Therefore, it is possible to suppress excessive oxidation and burning. Accordingly, it is possible to provide a piercing hole having a desired hole diameter in a simple and secure manner while providing high efficiency.

The injection pressure P of the assist gas G is adjusted on the basis of the requirements defined by the formulas (4-1) to (4-4). Even when the piercing processing has proceeded to the vicinity of a processing end point in the thickness t direction of the workpiece W, the injection energy of the assist gas can reach the bottom of the processing portion. By setting the injection pressure P to be not less than its lower limit that is defined by the above formulas, it is possible to discharge the molten material from the piercing hole and to thus suppress the molten material from remaining in the piercing hole. As a result, occurrence of deterioration in a final product can be suppressed and the processing efficiency is improved. By setting the injection pressure P to be not more than its upper limit that is defined by the above formulas, it is possible to suppress excessive oxidation in the piercing hole and to suppress the amount of scattering dross from increasing. Accordingly, it is possible to provide a piercing hole having a desired diameter while improving the productivity and the processing efficiency.

In this way, because a piercing hole can be formed to a desired diameter with high precision and high efficiency, it is possible reduce the production lead time and the production cost.

Next, the above-described formulas will be described with reference to FIGS. 12 to 16.

Figure 12:
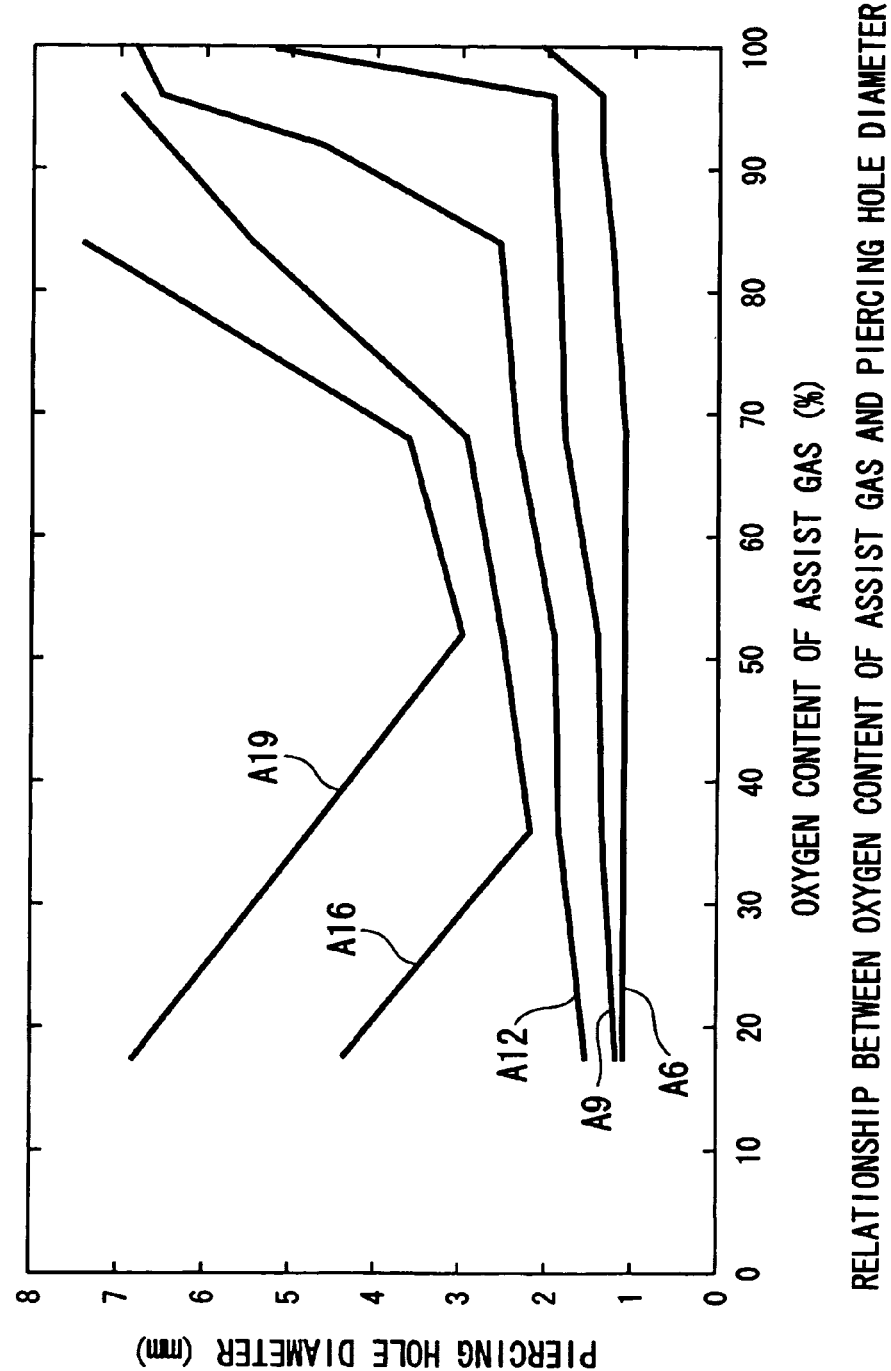
FIG. 12 is a diagram showing the relationship between the oxygen content of an assist gas and a piercing hole diameter according to the second embodiment of the present invention.
Figure 13:
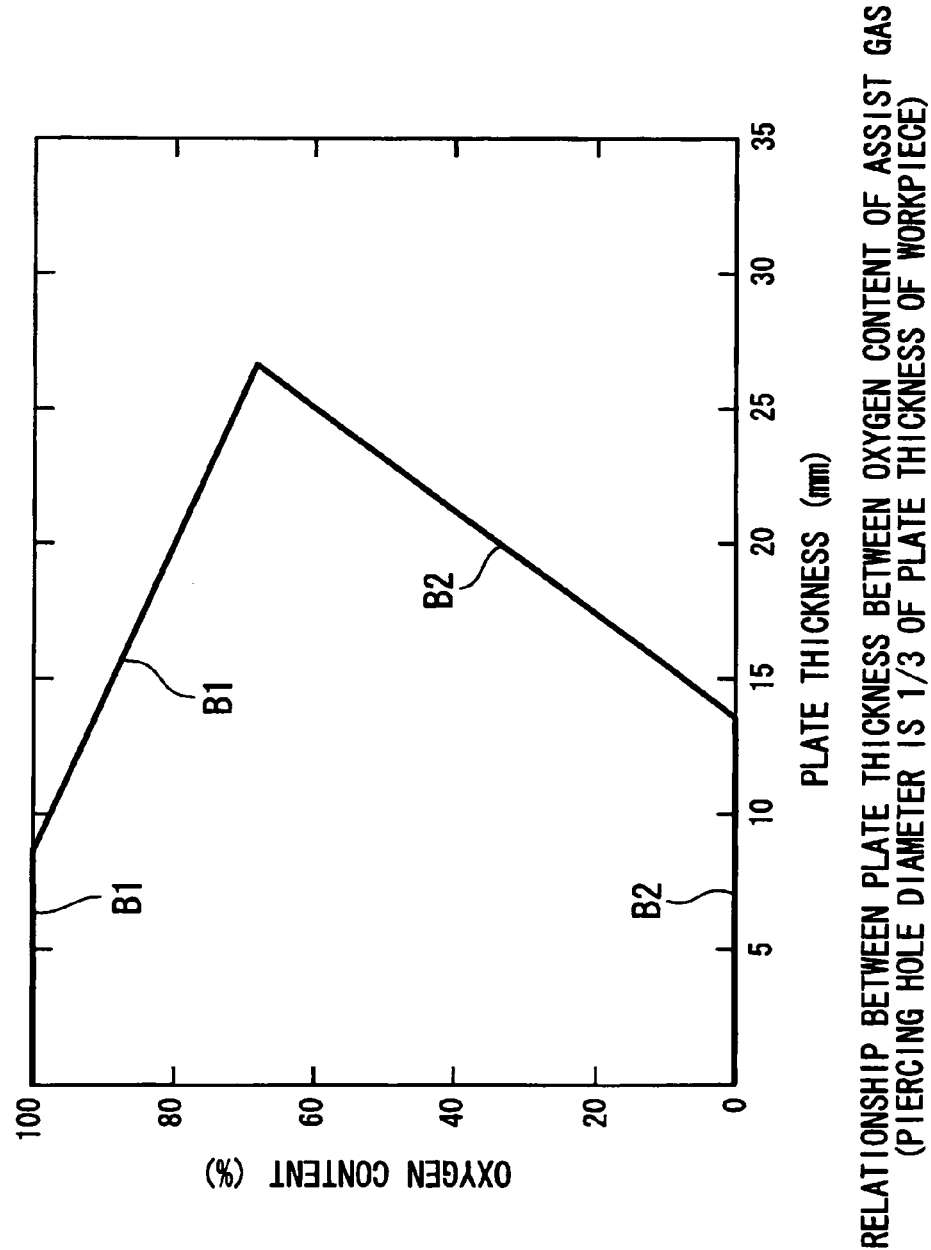
FIG. 13 is a diagram showing the relationship between a plate thickness and the oxygen content of the assist gas according to the second embodiment of the present invention.
Figure 14:
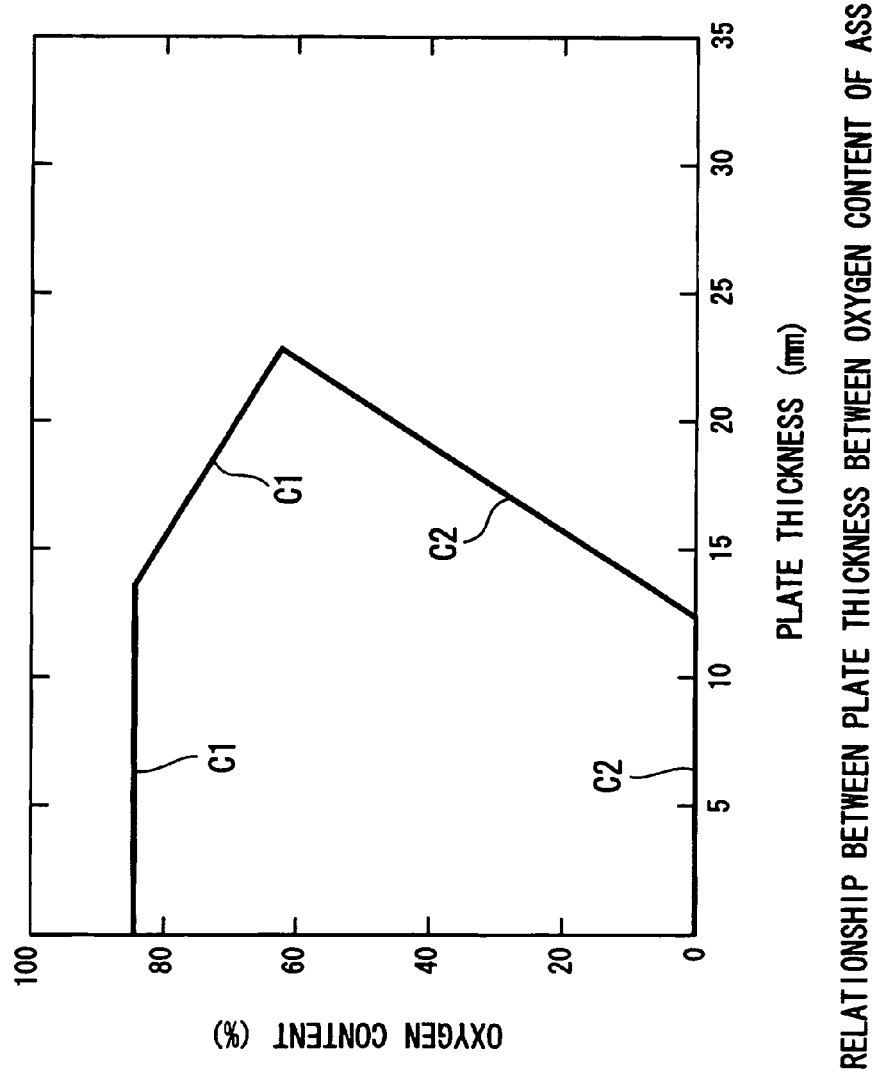
FIG. 14 is a diagram showing the relationship between a plate thickness and the oxygen content of the assist gas according to the second embodiment of the present invention.
Figure 15:
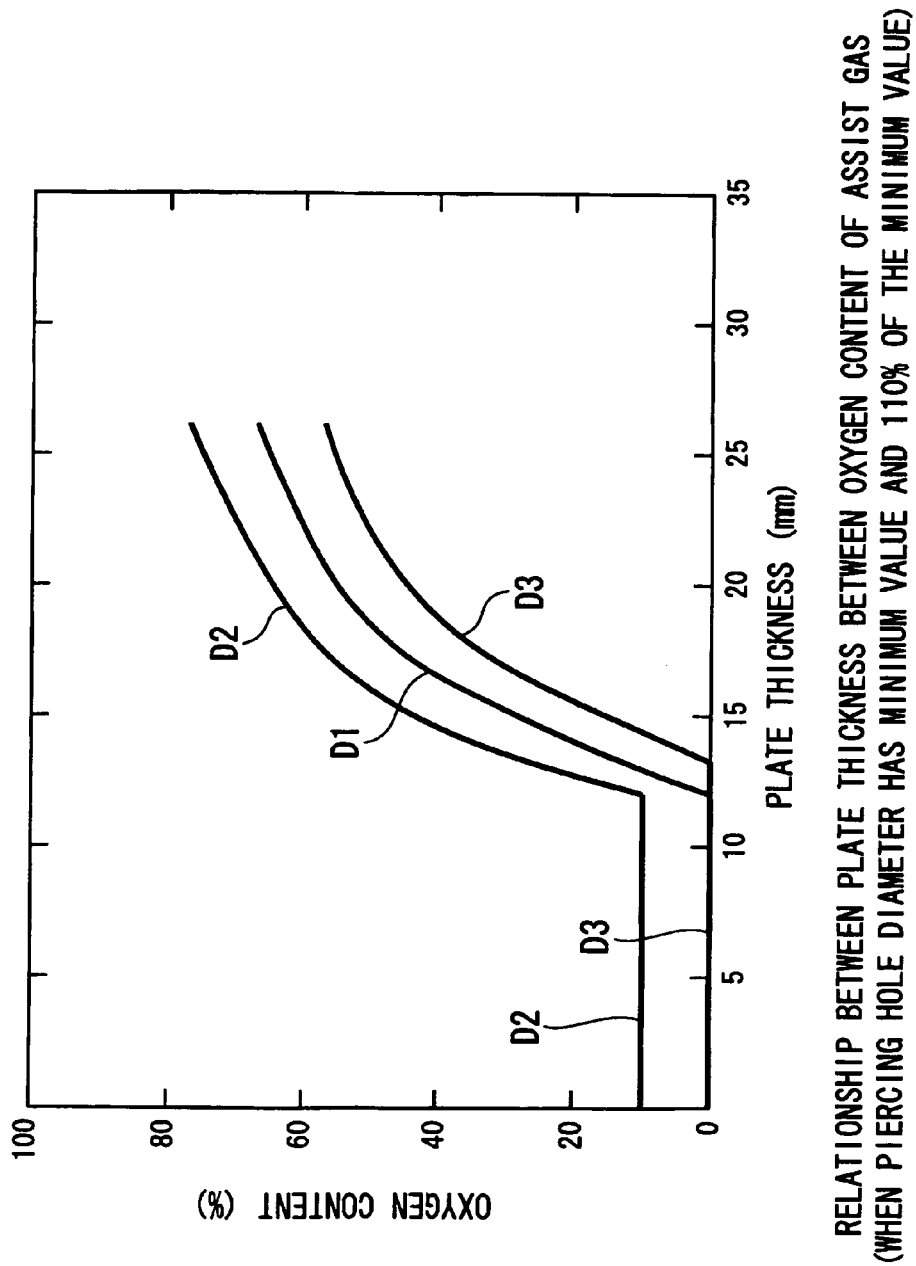
FIG. 15 is a diagram showing the relationship between a plate thickness and the oxygen content of the assist gas according to the second embodiment of the present invention.
Figure 16:
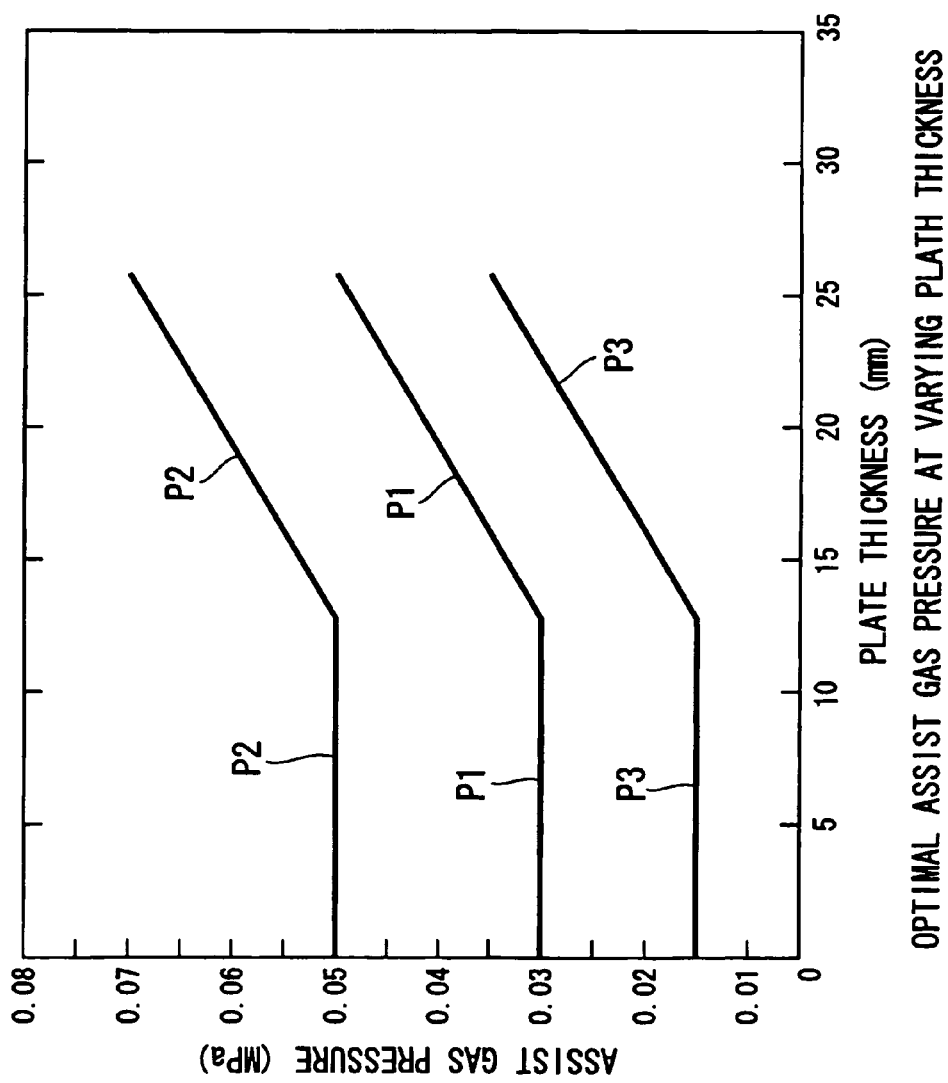
FIG. 16 is a diagram showing the relationship between a plate thickness of a workpiece and the injection pressure of the assist gas according to the second embodiment of the present invention.
Figure 17:
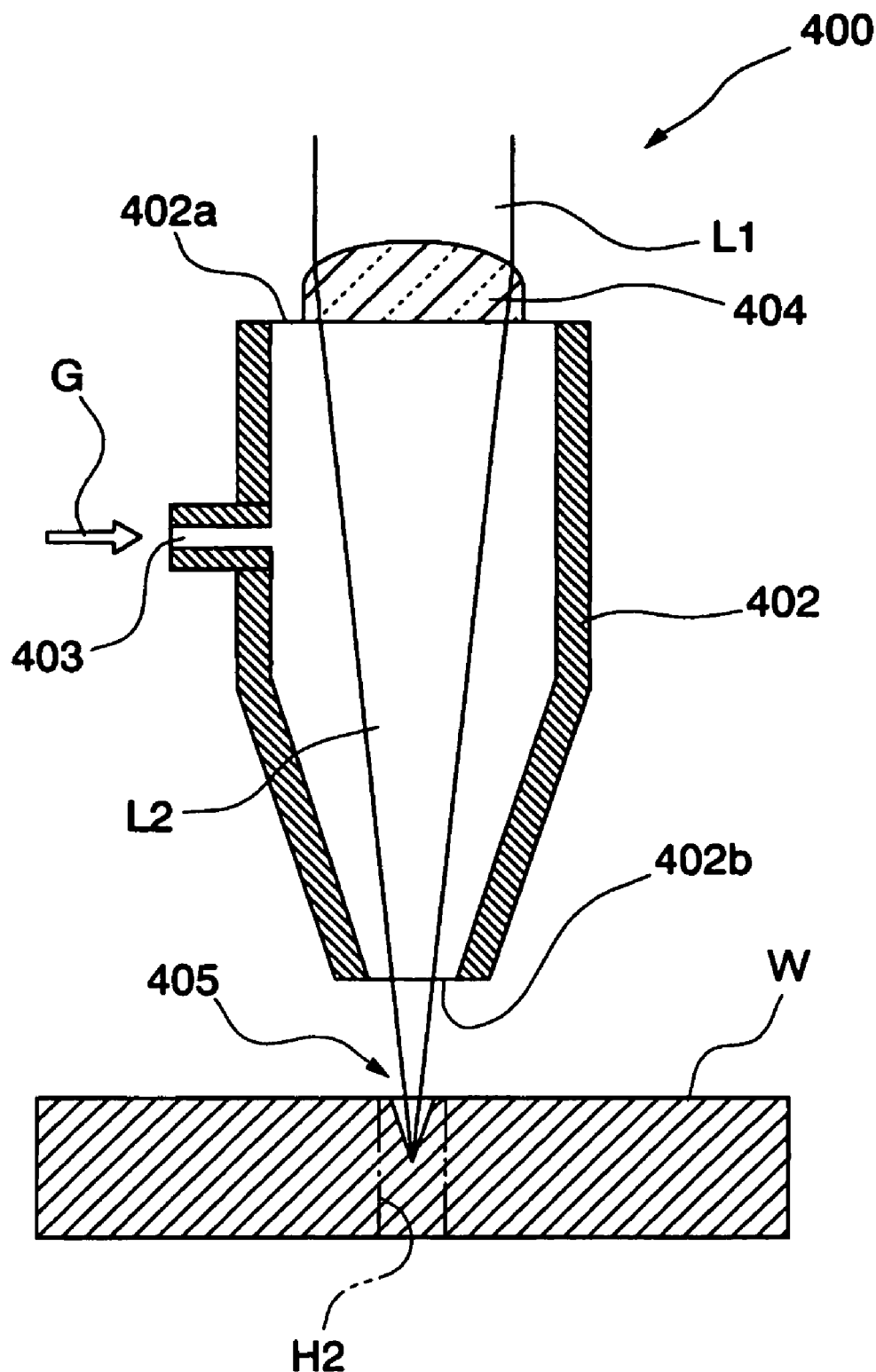
FIG. 17 is a diagram schematically showing a nozzle portion of a conventional laser processing apparatus.

FIG. 12 shows the relationship between the oxygen content of the assist gas G and the piercing hole diameter according to the second embodiment. FIGS. 13 to 15 show the relationship between the plate thickness of the workpiece and the oxygen content of the assist gas. FIG. 16 shows the relationship between the plate thickness of the workpiece and the injection pressure of the assist gas G.

FIG. 12 shows the relationship between the oxygen content of the assist gas G and the piercing hole diameter when the workpiece is a steel plate. In the drawing, reference numerals A6, A9, A12, A16, and A19 represent piercing hole diameters when the piercing holes were formed in the steel plates having a plate thickness of 6 mm, 9 mm, 12 mm, 16 mm, and 19 mm, respectively, by irradiating a continuous laser beam with a power of 6 kW while injecting an assist gas G with varying oxygen contents as indicated on the horizontal axis.

FIG. 13 shows the oxygen content range of the assist gas G where it is possible to provide a piercing hole having a diameter not more than ⅓ of the plate thickness, the range is derived from the relationship shown in FIG. 12. In FIG. 13, the range between B1 and B2 corresponds to the range where it is possible to provide a piercing hole having a diameter not more than ⅓ of the plate thickness.

FIG. 14 shows the oxygen content range of the assist gas G where it is possible to provide a piercing hole having a diameter not more than ⅕ of the plate thickness, the range being derived from the relationship shown in FIG. 12. In FIG. 14, the range between C1 and C2 corresponds to the range where it is possible to provide a piercing hole having a diameter not more than ⅕ of the plate thickness.

In FIG. 15, D1 represents the oxygen content of the assist gas G where it is possible to provide a minimum piercing hole diameter, and the range between D2 and D3 corresponds to the oxygen content range of the assist gas G where it is possible to provide a piercing hole having a minimum diameter at the given plate thickness t.

FIG. 16 shows the injection pressure P of the assist gas G required for preventing adhering of molten material onto the piercing hole at a desired plate thickness t when using the oxygen content shown in FIGS. 13 to 15. In FIG. 16, P1 represents an optimal value of the injection pressure P; and P2 and P3 represent upper and lower limits of a suitable injection pressure range.

The injection pressure P of the assist gas G is a function that depends on the plate thickness t and not depending on the oxygen content C. It is not necessary to consider the injection pressure P of the assist gas G as an essential component of the oxygen content adjustment in the laser piercing processing.

In this way, the oxygen content of the assist gas G obtained on the basis of FIGS. 12 to 15 is specified by the above-described formulas (1-1), (1-2), (1-3), (2-1), (2-2), (3-1), (3-1), (3-3), (3-4), and (3-5).

In addition, the range of the injection pressure P of the assist gas G required for preventing adhering of molten material onto the piercing hole, as obtained on the basis of FIG. 16 is specified by the formulas (4-1), (4-2), (4-3), and (4-4).

The present invention is not limited to the second embodiment, but various modifications are possible without departing from the spirit of the present invention.

In the second embodiment, description has been made for the case where the workpiece W is a steel plate. However, the workpiece W applicable to the method and the processing apparatus of the present invention may be formed of other metals such as stainless steel, aluminum, copper or titanium, or an alloy thereof.

In the second embodiment, description has been made for the case where the oxygen content range is calculated from the above-described formulas. However, the oxygen content C may be adjusted without using formulas.

The piercing processing may be performed by using other formulas different from the above formulas. That is, description has been made for the case where the piercing hole diameter is not more than ⅕ of the plate thickness t. A piercing hole diameter greater than ⅕ of the plate thickness may be inputted as information on the piercing hole size. If the processing apparatus is provided with the above-described control section, the oxygen content and the injection pressure may be controlled by an opening-ratio adjusting device that uses scale marks, a toothed wheel or a link mechanism of the mass flow controllers 218 and 219 or the like.

In addition, description has been made for the case where the oxygen supply source 241 for supplying oxygen and the nitrogen supply source 243 for supplying nitrogen store liquid oxygen and liquid nitrogen, respectively, and the liquid oxygen and the liquid nitrogen are vaporized. However, one of the liquid oxygen and the liquid nitrogen may be replaced by liquid air. In addition, raw material of the assist gas may be supplied to the mixer 216 to produce the assist gas G by arbitrarily combining a method of using oxygen, nitrogen or air pressurized and stored in a tank or the like and a method of pressurizing air or the like by pressure.

Incidentally, the assist gas G may contain inert gases such as argon or helium.

In the second embodiment, description has been made for the case of continuously irradiating the laser beam L2 onto the steel plate W. However, a pulsed irradiation may be applied to the adjustment of the oxygen content of the assist gas G.

In the second embodiment, description has been made for the case where the processing section 212 calculates the oxygen content and the injection pressure P of the assist gas G corresponding to the plate thickness t on the basis of the data such as the plate thickness t inputted to the processing data input section 230 and controls the mass flow controllers 218 and 219 and the pressure adjustment valve 220. However, the calculation results based on the above formulas may be recorded on the data table, and the control data may be acquired on the basis of the recorded information. Moreover, the adjustment may be made by calculating the control data on the basis of the information such as the inputted plate thickness t or the like. Alternatively, the adjustment may be made on the basis of the data acquired from the data table. Alternatively, the adjustment may be made by acquiring only corresponding data without needing to calculate the oxygen content C and the injection pressure P.

In addition, description has been made for the case where the control data such as the opening ratios of the mass flow controllers 218 and 219 used for mixing the assist gas G is acquired from the data table 213. However, the control data required for the control may be calculated by the processing section 212.

INDUSTRIAL APPLICABILITY

When processing a piercing hole on a workpiece, it is possible to provide a piercing hole having a desired diameter with high efficiency and high precision while suppressing excessive oxidation.

The invention claimed is:

1. A laser piercing method in which a laser beam is irradiated onto a processing portion of a workpiece, and at the same time as the laser irradiation, an assist gas is injected toward the processing portion from a nozzle arranged concentric to the laser beam so that the processing portion is covered with the assist gas, thereby processing a piercing hole on the processing portion,
wherein a piercing hole processing is performed while moving the nozzle within a range of 5 mm from a processing start point after the laser irradiation is started,
an oxygen content C and an injection pressure P of the assist gas are determined on the basis of the thickness of the processing portion,
the oxygen content C is determined by the following formulas:
for a plate thickness t in the range of 0<t<12.0 mm, the oxygen content C is in the range of 0<C<10;
for a plate thickness t in the range of 12.0≦t<13.3 mm, the oxygen content C is in the range of $0<C \leqq -0.255t^2 + 14.5t - 127.2$; and
for a plate thickness t in the range of 13.3≦t≦26.33 mm, the oxygen content C is in the range of $-0.255t^2 + 14.5t - 147.2 \leqq C \leqq -0.255 t^2 + 14.5t - 127.2$; and
wherein the injection pressure P of the assist gas is determined by the following formulas:
for a plate thickness t in the range of 0<t<13.0 mm, the injection pressure P is in the range of 0.015≦P≦0.05; and
for a plate thickness t in the range of 13.0≦t≦26.33 mm, the injection pressure P is in the range of 0.002t−0.011≦P≦0.002t+0.024,
wherein P denotes an injection pressure (MPa) of the assist gas, C denotes the oxygen content (volume %), and t denotes the thickness (mm) of the workpiece.

2. The laser piercing method according to claim 1, wherein the nozzle orbits around the processing start point.

3. The laser piercing method according to claim 1, wherein the nozzle moves along a reciprocating trajectory.

4. The laser piercing method according to claim 1, wherein the nozzle moves in a zigzag manner.

5. The laser piercing method according to claim 1, wherein after the piercing hole is penetrated, the nozzle is moved upward from the surface of the workpiece at the periphery of the piercing hole, and is allowed to orbit around the piercing hole while irradiating the laser beam to melt dross again and injecting the assist gas from the nozzle, thereby removing the dross formed at the periphery of the piercing hole.

6. A processing apparatus in which a laser beam is irradiated onto a processing portion of a workpiece, and at the same time as the laser irradiation, an assist gas is injected toward the processing portion from a nozzle arranged concentric to the laser beam so that the processing portion is covered with the assist gas, thereby processing a piercing hole on the processing portion, the apparatus comprising:
control means for performing a piercing hole processing while moving the nozzle within a range of 5 mm from a processing start point after the laser irradiation is started;
a thickness input section for inputting the thickness of the processing portion; and adjustment means for adjusting an oxygen content and an injection pressure of the assist gas, wherein the adjustment means automatically adjusts the oxygen content C and the injection pressure P of the assist gas on the basis of the thickness of the processing portion inputted from the thickness input section as the following formulas:

for a plate thickness t in the range of 0<t<12.0 mm, the oxygen content C is in the range of 0<C<10;

for a plate thickness t in the range of $12.0 \leqq t < 13.3$ mm, the oxygen content C is in the range of $0 < C \leqq -0.255t^2 + 14.5t - 127.2$; and for a plate thickness t in the range of $13.3 \leqq t \leqq 26.33$ mm, the oxygen content C is in the range of $-0.255t^2 + 14.5t - 147.2 \leqq C \leqq -0.255t^2 + 14.5t - 127.2$, and for a plate thickness t in the range of 0<t<13.0 mm, the injection pressure P is in the range of 0.015<P<0.05; and for a plate thickness t in the range of $13.0 \leqq t \leqq 26.33$ mm, the injection pressure P is in the range of $0.002t - 0.011 \leqq P \leqq 0.002t + 0.024$, wherein P denotes an injection pressure (MPa) of the assist gas, C denotes the oxygen content (volume %), and t denotes the thickness (mm) of the workpiece.

7. The processing apparatus according to claim 6, wherein the control means includes dross removal means for moving the nozzle upward from the surface of the workpiece at the periphery of the piercing hole after the piercing hole is penetrated, and allowing the nozzle to orbit around the piercing hole while irradiating the laser beam to melt dross again and injecting the assist gas from the nozzle, thereby removing the dross formed at the periphery of the piercing hole.

8. The processing apparatus according to claim 6, wherein the control means includes orbit control means for causing the nozzle to orbit around the processing start point.

9. The processing apparatus according to claim 6, wherein the control means includes reciprocation control means for causing the nozzle to move along a reciprocating trajectory.

10. The processing apparatus according to claim 6, wherein the control means includes zigzag control means for causing the nozzle to move in a zigzag manner.

* * * * *

UNITED STATES PATENT AND TRADEMARK OFFICE
CERTIFICATE OF CORRECTION

| | | |
|---|---|---|
| PATENT NO. | : 8,183,499 B2 | Page 1 of 1 |
| APPLICATION NO. | : 11/921830 | |
| DATED | : May 22, 2012 | |
| INVENTOR(S) | : Numata et al. | |

It is certified that error appears in the above-identified patent and that said Letters Patent is hereby corrected as shown below:

On the front page, in section (75), line 1, replace "Saitama-ken (JP);" with --Kawagoe (JP);--.
    On the front page, in section (75), line 2, replace "Saitama-ken (JP)" with --Fujimi (JP)--.

Signed and Sealed this
Eighteenth Day of December, 2012

David J. Kappos
*Director of the United States Patent and Trademark Office*